US008884575B2

(12) United States Patent
Takahata et al.

(10) Patent No.: US 8,884,575 B2
(45) Date of Patent: Nov. 11, 2014

(54) DRIVE SYSTEM FOR SYNCHRONOUS ELECTRICAL MOTOR

(71) Applicant: Hitachi Automotive Systems, Ltd., Hitachinaka (JP)

(72) Inventors: Ryoichi Takahata, Hitachi (JP); Yoshitaka Iwaji, Hitachinaka (JP); Shigehisa Aoyagi, Hitachinaka (JP); Kazuaki Tobari, Hitachiota (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 36 days.

(21) Appl. No.: 13/859,052

(22) Filed: Apr. 9, 2013

(65) Prior Publication Data

US 2013/0272899 A1    Oct. 17, 2013

(30) Foreign Application Priority Data

Apr. 17, 2012 (JP) ................. 2012-094009

(51) Int. Cl.
| H02P 1/46 | (2006.01) |
| H02P 3/18 | (2006.01) |
| H02P 6/00 | (2006.01) |
| H02P 6/18 | (2006.01) |
| H02P 21/00 | (2006.01) |

(52) U.S. Cl.
CPC ........... *H02P 6/183* (2013.01); *H02P 21/0042* (2013.01); *H02P 6/182* (2013.01)
USPC ..................................................... 318/700

(58) Field of Classification Search
CPC ..................................................... H02P 6/186
USPC ..................................................... 318/700
See application file for complete search history.

(56) References Cited

U.S. PATENT DOCUMENTS

| 6,462,492 | B1 * | 10/2002 | Sakamoto et al. | 318/400.32 |
| 7,023,158 | B2 * | 4/2006 | Hirono | 318/400.11 |
| 7,095,204 | B2 * | 8/2006 | Lee et al. | 318/700 |
| 7,141,949 | B2 * | 11/2006 | Harwood | 318/400.35 |
| 7,768,226 | B2 * | 8/2010 | Fukamizu et al. | 318/700 |

FOREIGN PATENT DOCUMENTS

| JP | 2001-275387 A | 10/2001 |
| JP | 2009-189176 A | 8/2009 |

* cited by examiner

*Primary Examiner* — Erick Glass
(74) *Attorney, Agent, or Firm* — Crowell & Moring LLP

(57) ABSTRACT

A drive system of a synchronous electrical motor includes a synchronous electrical motor; a power converter that is connected to the motor with a plurality of switching elements; a controller that outputs a voltage instruction to the power converter; a voltage detection unit for open phases upon application of respective positive and negative pulse voltages between respective two phases out of three-phase windings of the motor; an induced voltage difference for calculating an induced voltage difference that is a difference between an induced voltage detected by the voltage detection unit at each of the open phases upon application of the positive voltage pulse between the corresponding two phases and an induced voltage detected by the voltage detection unit at the open phase upon application of the negative voltage pulse between the two phases.

20 Claims, 21 Drawing Sheets

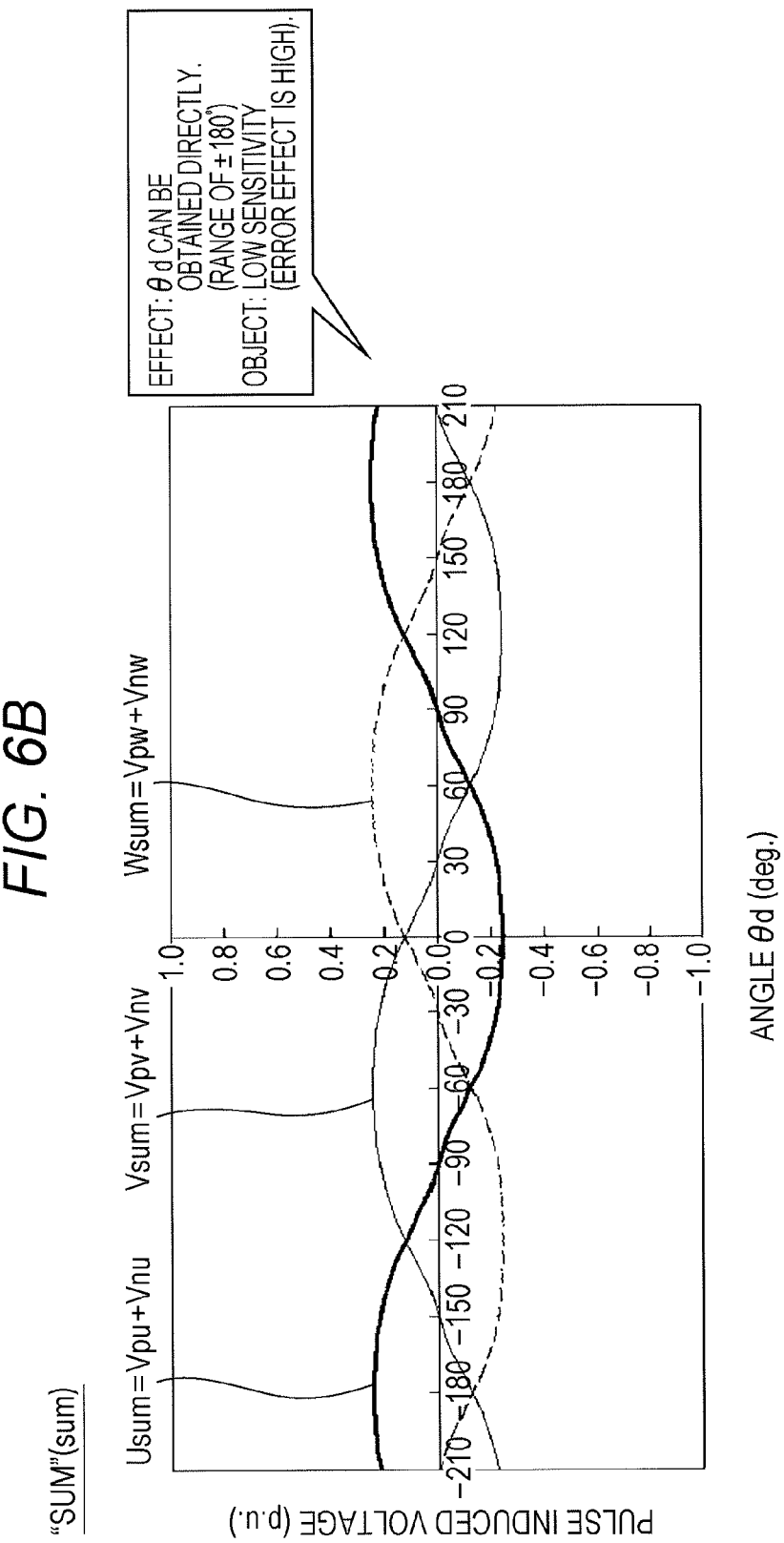

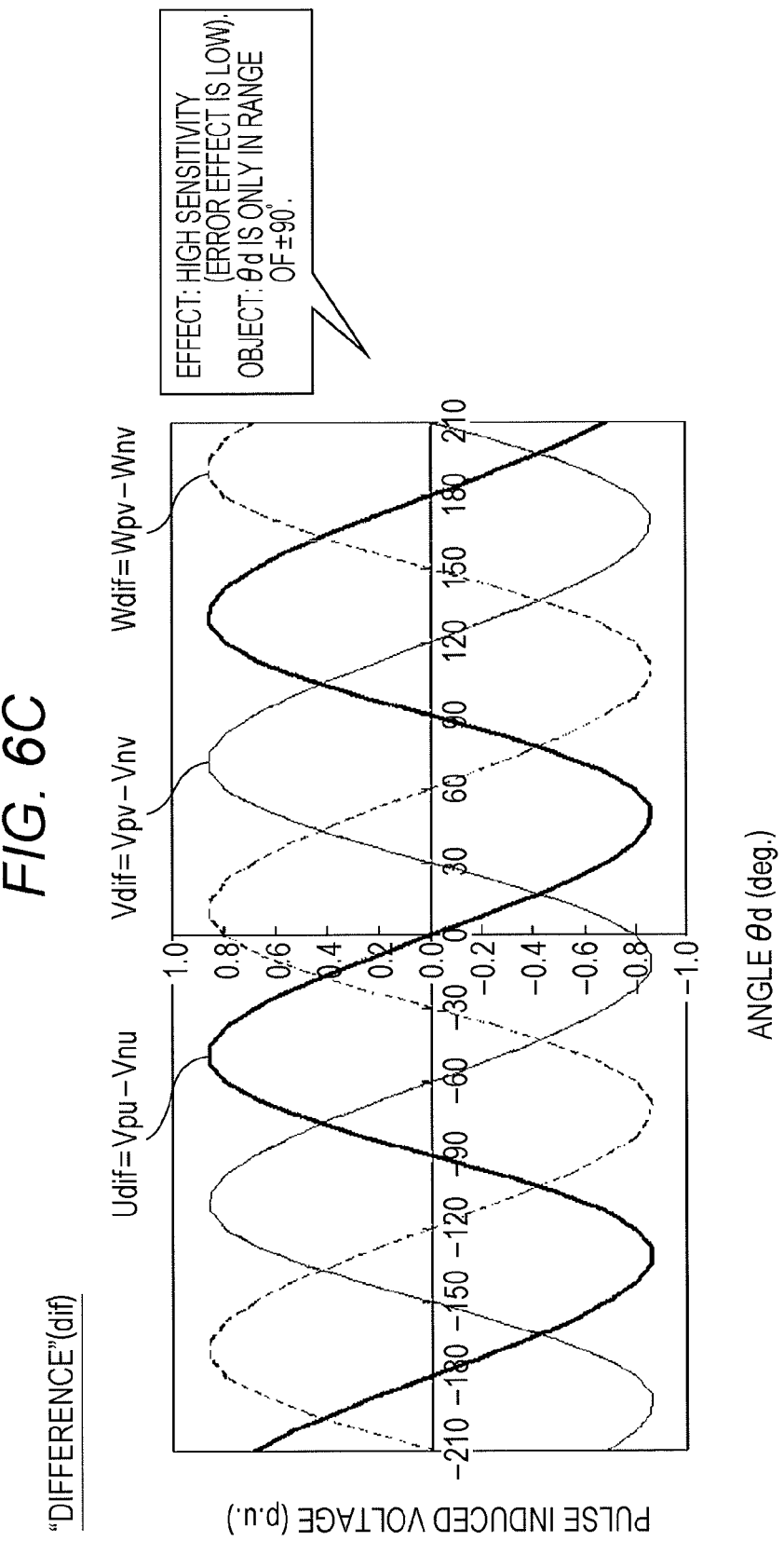

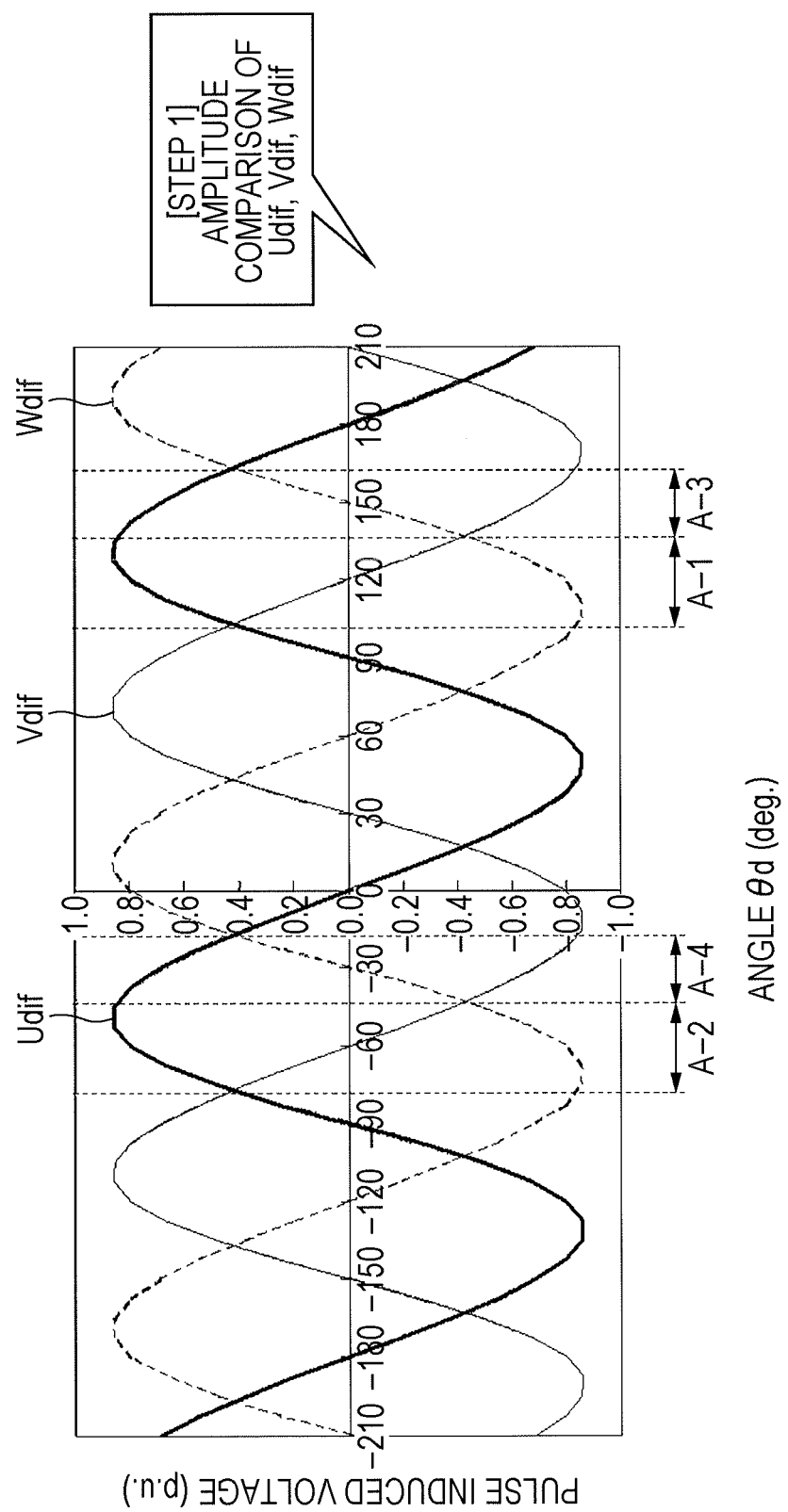

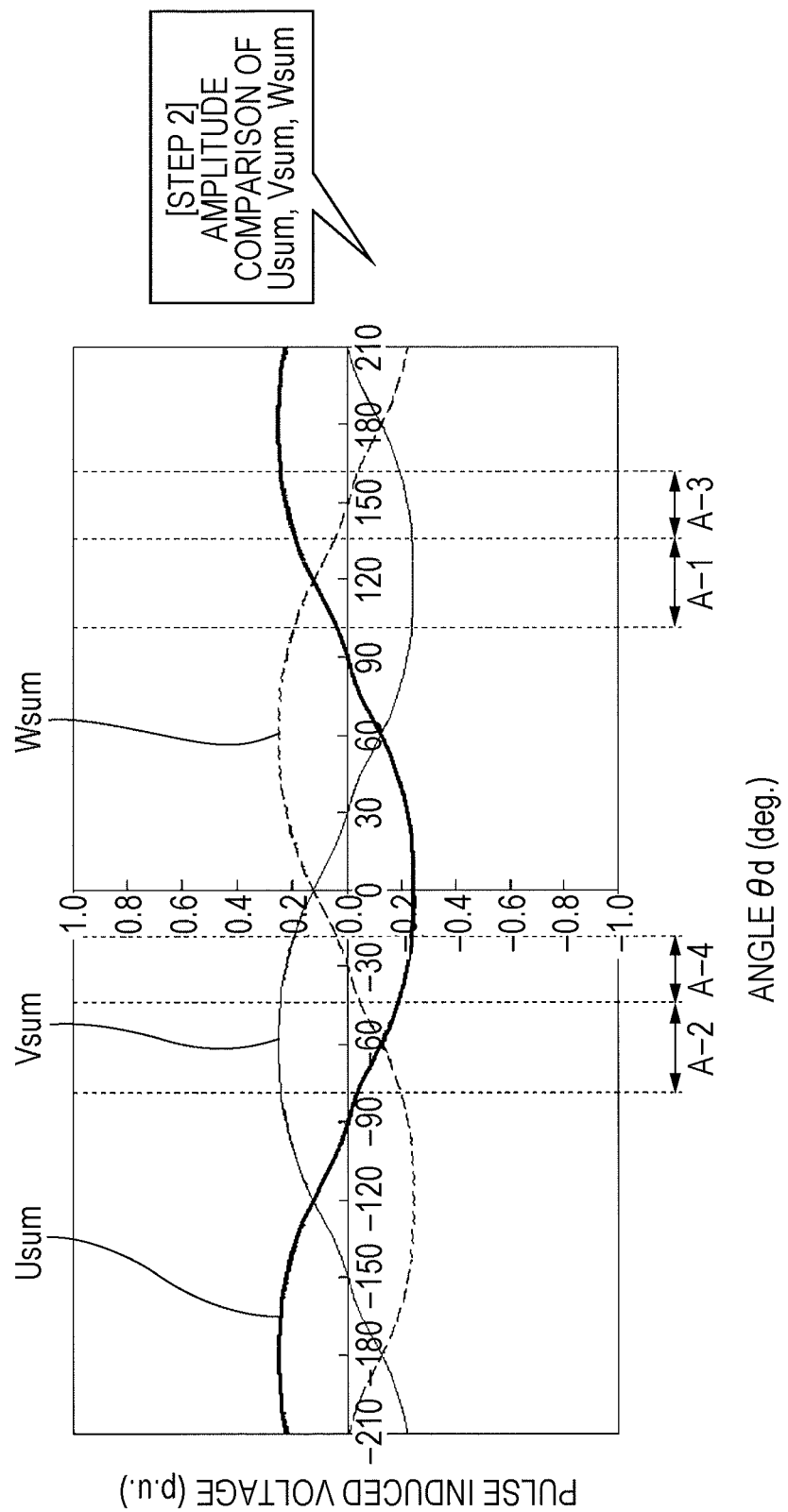

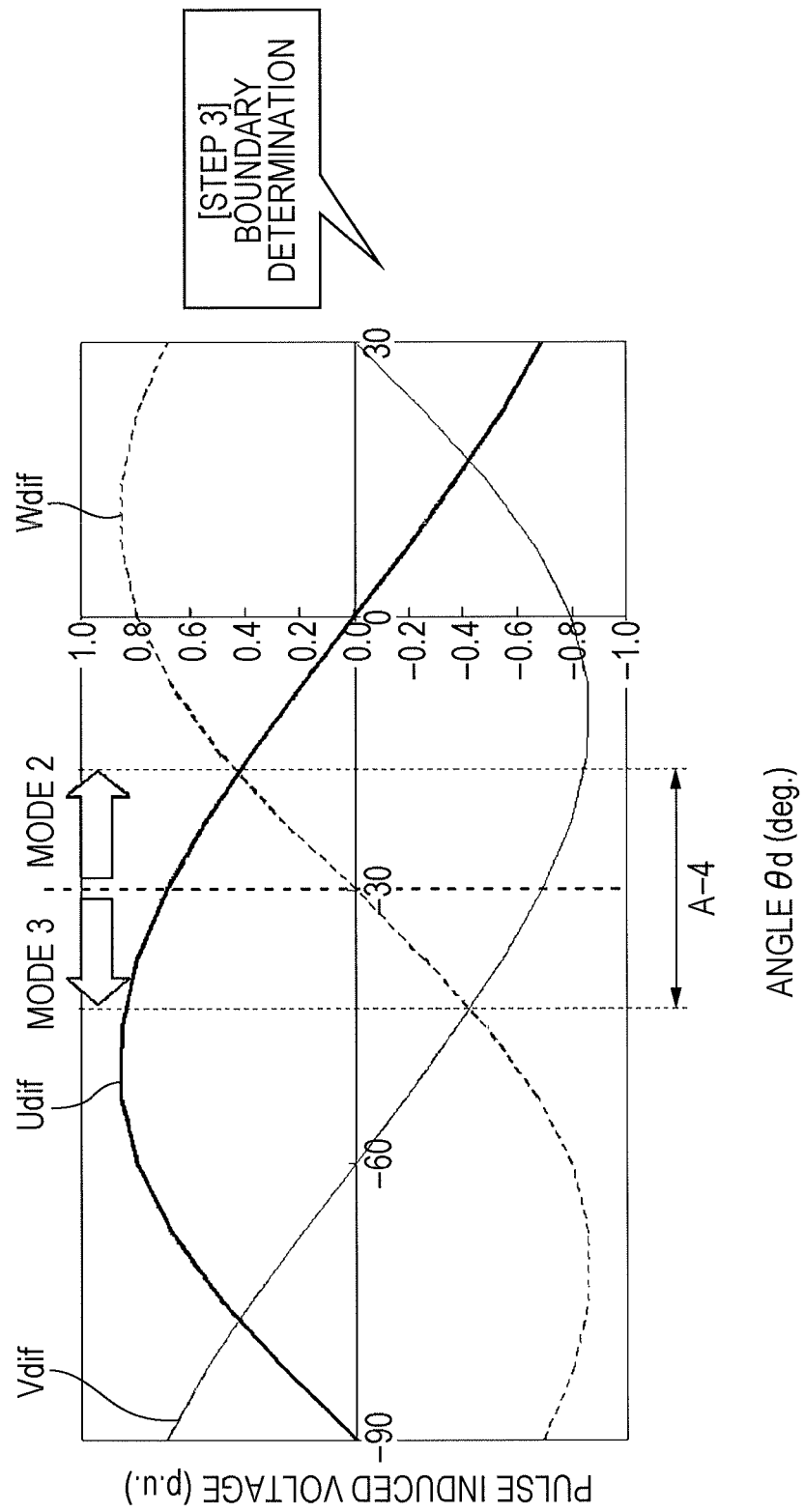

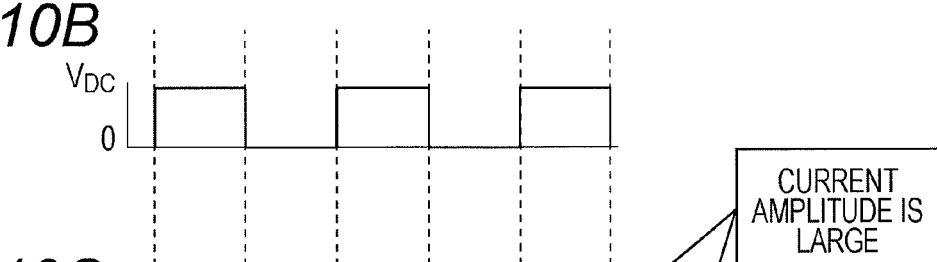
FIG. 10B
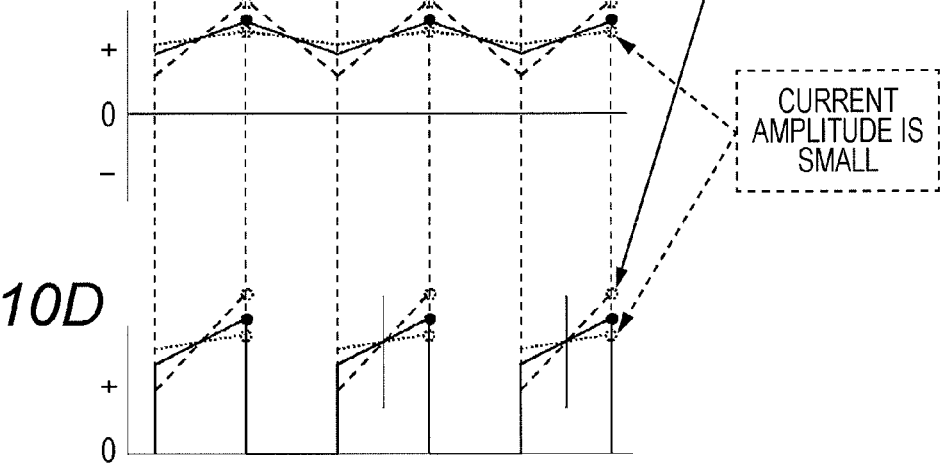
FIG. 10C
FIG. 10D
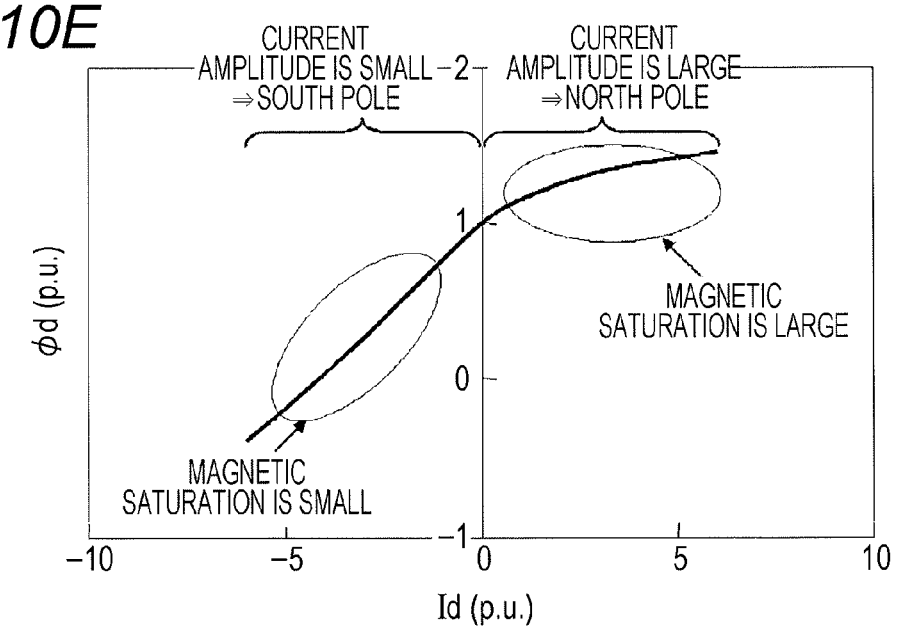
FIG. 10E

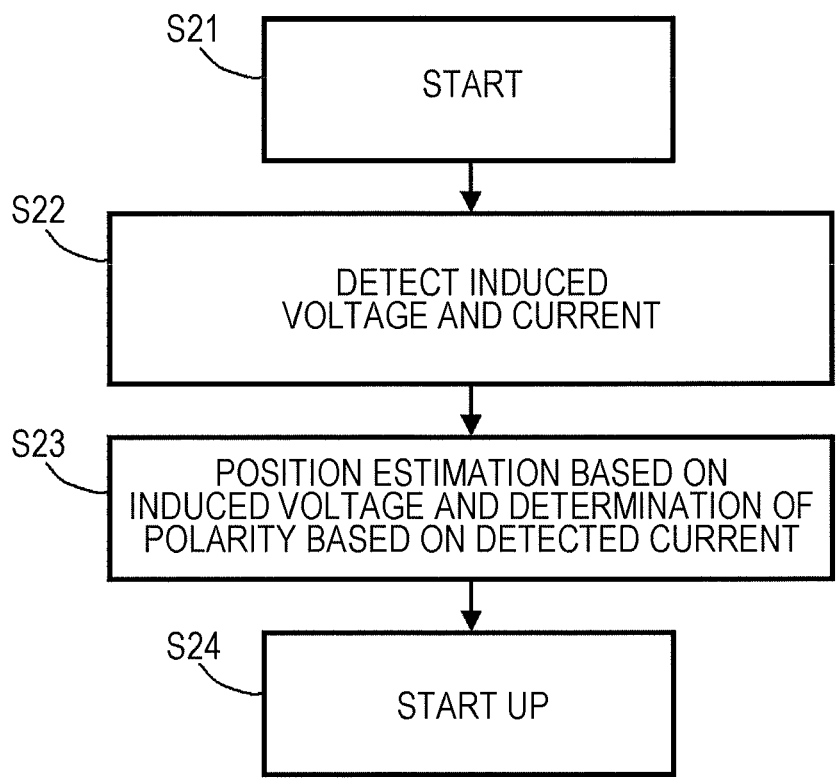

DRIVE SYSTEM FOR SYNCHRONOUS ELECTRICAL MOTOR

BACKGROUND OF THE INVENTION

1. Field of the Invention

The present invention relates to a drive system of a synchronous electrical motor.

2. Description of the Related Art

In an electrical motor drive system used in a vehicle, industry, a home electrical appliance, and the like, a small and highly efficient permanent magnet electrical motor (synchronous electrical motor) is widely used. Such a permanent magnet electrical motor is used in a torque assisted device, positioning control, fan, pump, compressor, and the like, for example.

In order to drive a permanent magnet electrical motor (abbreviated to PM electrical motor hereinafter), information about a rotation position of the PM electrical motor is required, and thus a position sensor therefor is required. In recent years, "sensorless control" in which a rotational speed or a torque of a PM electrical motor is controlled without such a position sensor is widely spread.

If the sensorless control can be practically used, cost expensed for a position sensor (cost of the sensor itself, cost expensed for wiring the sensor, and the like) can be reduced. In addition, due to the unnecessity of the sensor, the size of the system can be reduced and the system can be used in an adverse environment, thus causing a great advantage. Currently, for a sensorless control of a PM electrical motor, a method of directly detecting induced voltage (speed electromotive voltage) that is generated by rotation of the rotor, and driving a PM electrical motor by using the voltage as position information of the rotor, a position estimation technique for estimating and calculating a rotor position based on a mathematical model of an electrical motor to be controlled, and the like are used.

A big problem of these sensorless control schemes is a position detection method during low speed operation including the stopped state (zero speed). Most of sensorless controls that can be practically used currently are based on speed electromotive voltage generated by a PM electrical motor. Therefore, in a stop/low speed range where the induced voltage is small, the sensitivity is decreased and position information is buried in noise.

As a conventional scheme for solving this problem, JP-2009-189176-A discloses a control scheme for switching a current-applied phase based on induced voltage generated at an open phase in a position sensorless control scheme based on the 120 degree current application control of a PM electrical motor in a stop/low speed range. This induced voltage is induced voltage generated due to change of a magnetic circuit inside the PM electrical motor, and thus the scheme is on a principle different from that of the conventional scheme using speed electromotive voltage due to the rotation speed. Therefore, a sensorless control can be realized in the stop/slow speed range.

JP-2001-275387-A discloses a rotor position estimation technique using a position sensorless control scheme when the motor is stopped based on the 120 degree current application control of the PM electrical motor similarly to the method described in JP-2009-189176-A. In JP-2001-275387-A, when the PM electrical motor is in the stopped state, six voltage pulses are applied between phases of the three-phase windings (positive and negative pulses are applied between two phases out of the three phases), and based on the six induced voltage values generated at open phases at the respective time, the initial position of the rotor is estimated. With this method, the initial position of the rotor can be estimated in a short time, and thus a sensorless driving is realized without causing negative rotation of the electrical motor and also in a short time.

SUMMARY OF THE INVENTION

However, in the above described conventional techniques, no description about initial position estimation when the PM electrical motor is in the stopped state is provided in the invention of JP-2009-189176-A for example. If a motor is started up with its initial position unknown, a problem that the rotor negatively rotates is caused.

On the other hand, in the invention of JP-2001-275387-A, the initial position of the rotor is estimated in principle, but a problem may be caused in precision of the estimation. Since an open phase induced voltage used for initial position estimation depends on magnetic circuit characteristic of the electrical motor, the open phase induced voltage may show a characteristic having a very low sensitivity depending on the electrical motor. Specifically, respective open phase induced voltages generated when a positive pulse and a negative pulse are applied between windings out of the three-phase windings are synthesized (sum), and amplitude relationships of the respective values of the three phases are compared so that the initial position of the rotor is estimated. Depending on a characteristic of an electrical motor, the value obtained by synthesizing the open phase induced voltages (sum) may be small, and thus sufficient estimation precision (resolution) of a rotor position may not be obtained. Therefore, initial position estimation may fail. As a result, problems such that an electrical motor cannot be started up or that the motor rotates negatively may be caused depending on conditions.

(1) An aspect of the invention for solving the above-described problems is a drive system of a synchronous electrical motor including: a synchronous electrical motor; a power converter that is connected to the synchronous electrical motor and that is constituted of a plurality of switching elements; a controller that controls the synchronous electrical motor by outputting a voltage instruction to the power converter; a voltage detection unit that detects induced voltages at respective open phases upon application of respective positive and negative pulse voltages between respective two phases out of three-phase windings of the synchronous electrical motor; an induced voltage difference calculating unit that calculates an induced voltage difference that is a difference between an induced voltage detected by the voltage detection unit at each of the open phases upon application of the positive voltage pulse between the corresponding two phases and an induced voltage detected by the voltage detection unit at the open phase upon application of the negative voltage pulse between the two phases; an induced voltage sum calculating unit that calculates an induced voltage sum that is a sum of the induced voltage detected by the voltage detection unit at each of the open phases upon application of the positive voltage pulse between the corresponding two phases and the induced voltage detected by the voltage detection unit at the open phase upon application of the negative voltage pulse between the two phases; and a rotor position determining unit that determines a rotor position based on the induced voltage difference and the induced voltage sum.

(2) Another aspect of the invention for solving the above-described problems is a drive system of a synchronous electrical motor including: a synchronous electrical motor; a power converter that is connected to the synchronous electrical motor and that is constituted of a plurality of switching elements; a controller that controls the synchronous electrical motor by outputting a voltage instruction to the power converter; a voltage detection unit that detects induced voltages at respective open phases upon application of respective positive and negative pulse voltages between respective two phases out of three-phase windings of the synchronous electrical motor; an induced voltage difference calculating unit that calculates an induced voltage difference that is a difference between an induced voltage detected by the voltage detection unit at each of the open phases upon application of the positive voltage pulse between the corresponding two phases and an induced voltage detected by the voltage detection unit at the open phase upon application of the negative voltage pulse between the two phases; a current detection unit that detects a current value of DC (Direct Current) power supplied to the power converter; and a rotor position determining unit that determines a rotor position based on the induced voltage difference and the current value of the DC (Direct Current) power.

As described above, according to the present invention, initial position estimation when the motor is stopped can be highly precisely performed in a short time, and thus a drive system of a PM electrical motor capable of starting up the motor without causing negative rotation of the motor and also in a short time can be provided.

BRIEF DESCRIPTION OF THE DRAWINGS

FIGS. 6A to 6C are schematic views of voltage waveforms of various types used to estimate a rotor position of the synchronous electrical motor of the first embodiment according to the present invention, where FIG. 6A is induced voltage waveforms similar to FIG. 4A, FIG. 6B shows sums of induced voltages upon application of the positive pulses and induced voltage upon application of the negative pulses, the pulses respectively shown in FIGS. 4A, 4B, and 4C, and FIG. 6C shows differences of induced voltages upon application of the positive pulses and induced voltage upon application of the negative pulses, the pulses respectively shown in FIGS. 4A, 4B, and 4C;

FIGS. 8A to 8C are views for explaining a method of estimating an initial position of the rotor of the first embodiment according to the present invention, where FIG. 8A is a view of voltage waveforms similar to FIG. 6C, FIG. 8B is a view of voltage waveforms similar to FIG. 6B, and FIG. 8C is an enlarged view of a part of FIG. 8A (part of A-4);

FIG. 9A shows pulse waveforms to be applied between two phases coils in the current application modes 1 to 3, and FIG. 9B shows an enlarged pulse voltage waveform Vvw of the V-phase in FIG. 9A;

FIGS. 10A to 10E are views schematically showing an inverter operation in a method of estimating a rotor position in a third embodiment of a drive system of a synchronous electrical motor according to the present invention, and DC voltage/current waveforms supplied to the inverter, where FIG. 10A shows a state of switching elements of the inverter in the current application mode 1, FIG. 10B shows a voltage waveform of DC current supplied to the inverter upon application of a positive pulse between the U-V phase coils in the state shown in FIG. 10A, FIG. 10C shows a coil current waveform flowing through the U-V phase coils corresponding to FIG. 10B, FIG. 10D shows a current waveform of DC current supplied to the inverter corresponding to FIG. 10B, and FIG. 10E shows that magnetic saturation occurs on a stator side when an orientation of a magnetic field by a permanent magnet of the rotor and an orientation of a magnetic field by coil current are identical;

FIG. 11A shows a stat up flow chart of the synchronous electrical motor, and FIG. 11B shows an example of a voltage waveform or a current waveform used in steps S2 and S3 in FIG. 11A;

FIG. 12 is a view showing a start up flow chart of a modification of the third embodiment of the drive system of the synchronous electrical motor according to the present invention;

DESCRIPTION OF THE PREFERRED EMBODIMENTS

Embodiments of the present invention will be hereinafter described referring to FIGS. 1 to 15. In the respective views, common reference signs are assigned to the same parts or components.

Note that a synchronous electrical motor to be controlled is herein described as a PM electrical motor, but other synchronous electrical motors (an electrical motor with a field winding as a rotor, and an electrical motor driven by reluctance torque, for example) may be used to provide almost similar effects.

First Embodiment

A configuration and a control scheme of a control device in low speed range will be firstly described. A technique of rotor position estimation using a position sensorless control is based on a control scheme that is based on 120 degree current application control as disclosed in JP-2009-189176-A.

Figure 1:
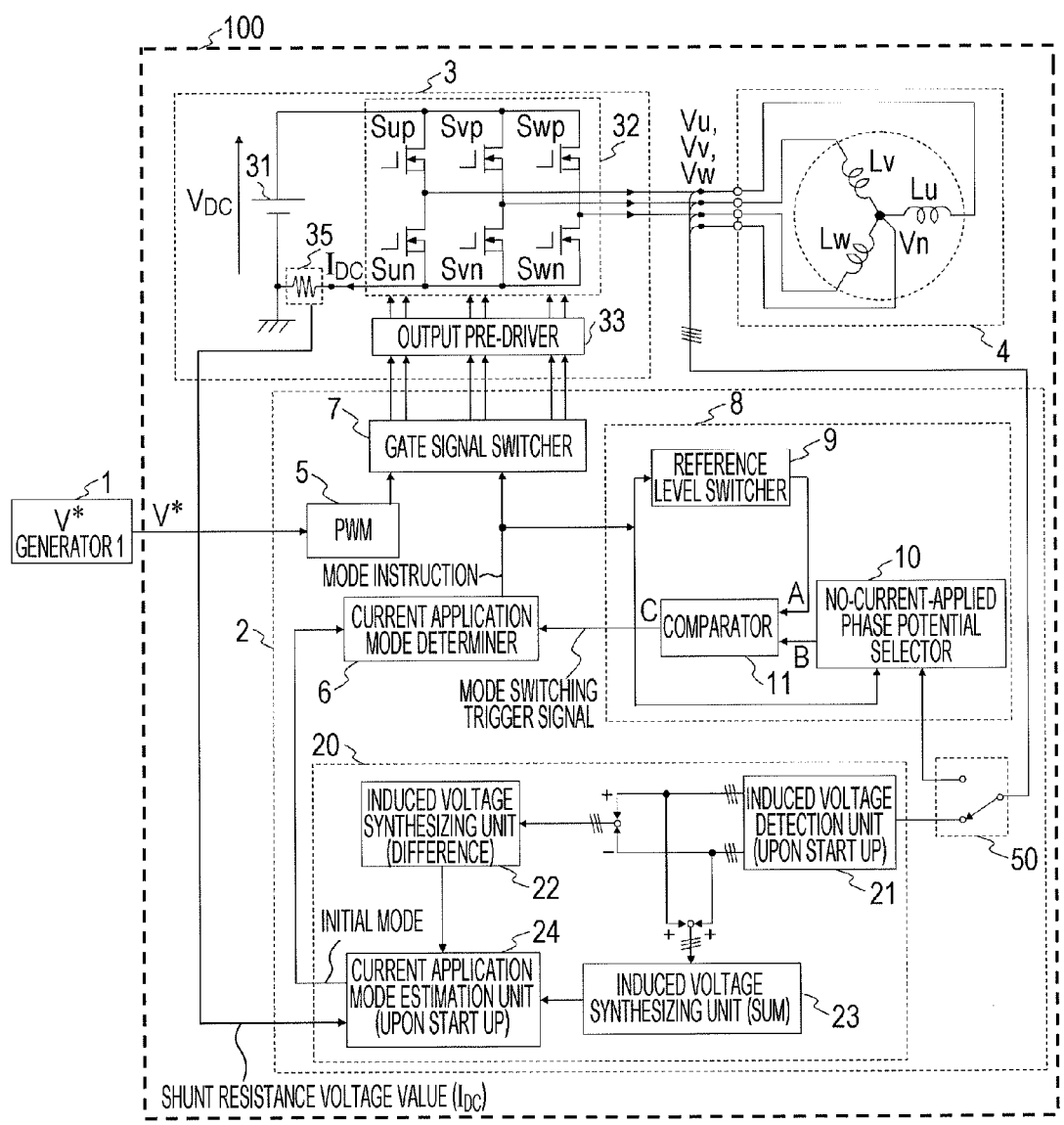
FIG. 1 is a block diagram showing a configuration of a first embodiment of a drive system of a synchronous electrical motor according to the present invention.

FIG. 1 is a block diagram showing a configuration of a first embodiment of a drive system of a synchronous electrical motor according to the present invention.

As shown in FIG. 1, a drive system of a synchronous electrical motor 100 of this embodiment includes: a PM electrical motor 4 to be controlled; a V* generator 1 that generates an instruction of voltage V* to be applied to this PM electrical motor 4; a power converter (inverter) 3 that is connected to the PM electrical motor 4 and that is constituted of a plurality of switching elements; and a controller 2 that controls the PM electrical motor 4 by outputting a voltage instruction to the inverter 3. The controller 2 selects two phases to be applied with current out of three-phase windings of the PM electrical motor 4, respectively applies positive and negative pulse voltages thereto, and estimates a phase (magnetic pole position of the rotor) and a rotation speed based on respective induced voltages of the open phase (no-current-applied phase) upon application of the positive and negative pulses.

The controller 2 includes: a PWM signal generator 5 that generates a PWM signal based on the voltage instruction V*; a current application mode determiner 6 that determines a current application mode defining a pattern of applying voltage to three-phase coils; a gate signal switcher 7 that switches a gate signal in such a manner that a voltage is applied to the respective phases in the determined current application mode; a mode switching trigger generator 8; a rotor position estimation unit 20 and a switching switch 50.

The mode switching trigger generator 8 compares the voltage of each of the three-phase windings with a reference level during normal operation of a rotating electric machine, thereby estimating a phase (magnetic pole position) and a rotation speed of the rotor, and generating a trigger signal for switching the current application mode at an appropriate timing.

The rotor position estimation unit 20 is operated when the PM electrical motor 4 is started up, and performs a position estimation of the rotor when the PM electrical motor 4 is in the stopped state (initial state). As to be described later, the initial state of the rotation position of the rotor is estimated by the rotor position estimation unit 20, and the current application mode determiner 6 determines the current application mode upon supply of drive current from the inverter 3 to the three-phase windings (Lu, Lv, Lw) of a stator when the PM electrical motor 4 is started based on the estimation. The switching switch 50 is a switch for inputting the induced voltage of the three-phase windings to the rotor position estimation unit 20 when the PM electrical motor 4 is started.

The inverter 3 includes: a DC power source 31; an inverter main circuit unit 32 constituted of six switching elements Sup to Swn; and an output pre-driver 33 directly driving the inverter main circuit unit 32.

(Control of PM Electrical Motor During Normal Operation)

An operation of sensorless control in 120 degree current application control in the PM electrical motor 4 that is common with the conventional technique will be briefly described below.

The V* generator 1 generates an instruction of voltage to be applied V* for the PM electrical motor 4. The V* generator 1 operates in such a manner that a voltage corresponding to this instruction V* is applied to the PM electrical motor 4 after pulse width modulation (PWM). The controller 2 generates a 120 degree current application wave after pulse width modulation by the PWM generator 5 based on the output of the V* generator 1. The current application mode determiner 6 sequentially outputs a mode instruction for determining six switching modes of the inverter main circuit unit 32.

The gate signal switcher 7 determines in what operation each of the switching elements of the inverter main circuit unit 32 switches based on the mode instruction, and outputs final six gate pulse signals to the inverter 3. The current application mode determiner 6 sequentially switches the current application mode according to a signal generated by the mode switching trigger generator 8.

The mode switching trigger generator 8 includes: a reference level switcher 9 that generates a threshold as a reference of the induced voltage of the no-current-applied phase of the PM electrical motor 4; a no-current-applied phase potential selector 10 that selects a no-current-applied phase from the three phase terminal voltage of the PM electrical motor 4 based on the mode instruction; and a comparator 11 that compares outputs of the no-current-applied phase potential selector 10 and generates a mode switching trigger.

Note that in 120 degree current application scheme, the controller 2 selects two phases out of the three-phase windings of the PM electrical motor 4 and applies voltage therebetween, thereby generating a torque. There exist six combinations of two phases, and they are respectively defined as current application modes 1 to 6.

Figure 2A:
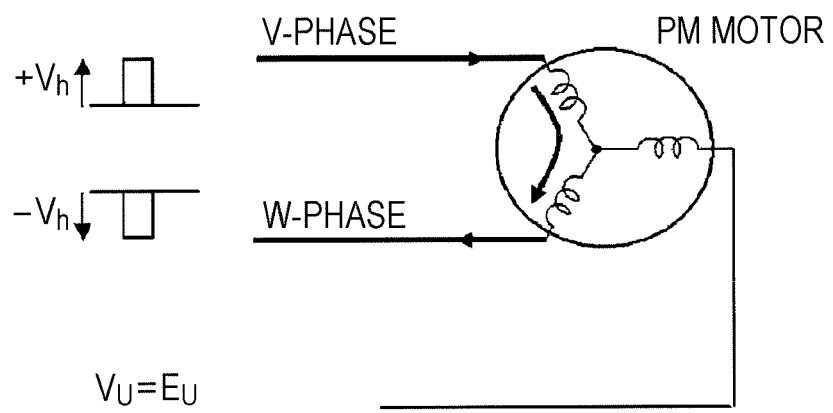
FIG. 2A is a schematic view of the synchronous electrical motor 4 of FIG. 1 when positive pulse voltage is applied between two phase coils (V-W phase) of the rotor.
Figure 2B:
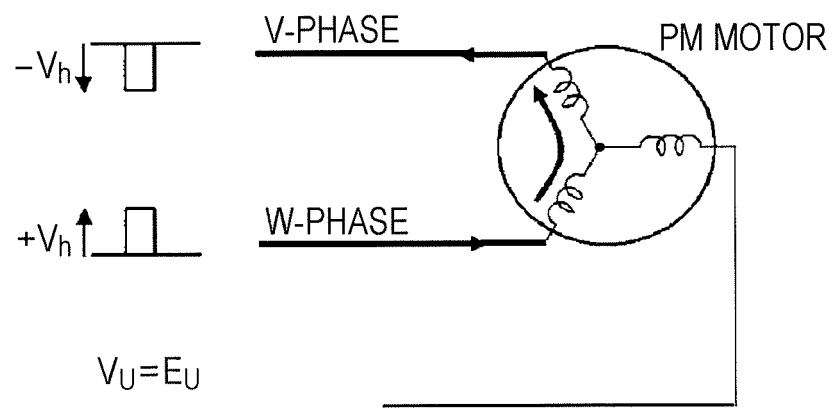
FIG. 2B is a schematic view of the synchronous electrical motor 4 when negative pulse voltage is applied between two phase coils (V-W phase)
Figure 3:
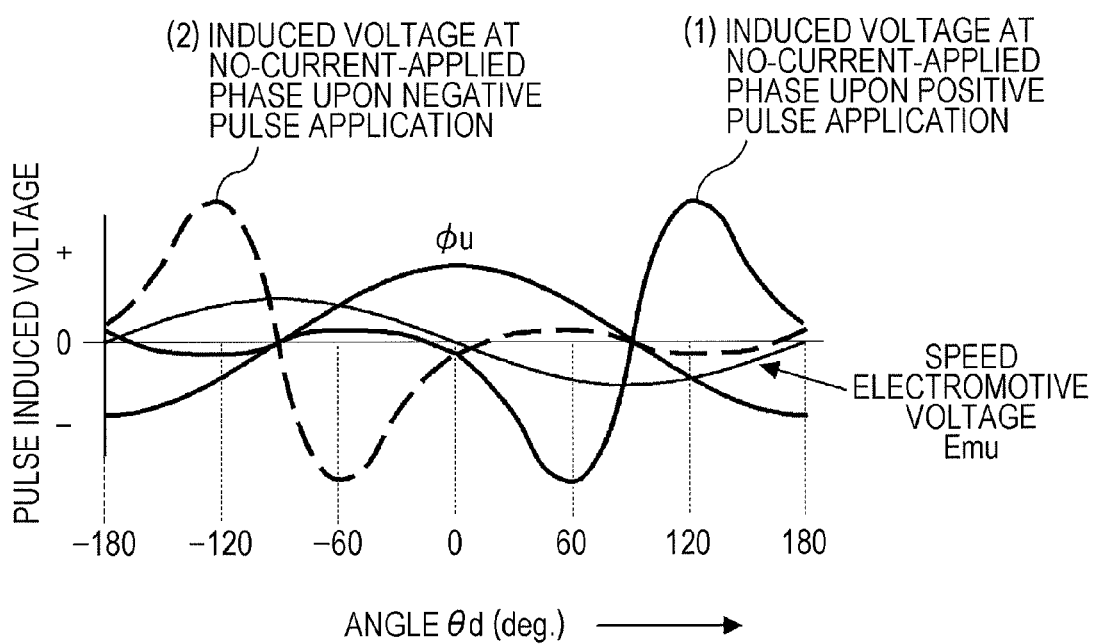
FIG. 3 is a view showing an example of voltage induced at a no-current-applied phase coil (U-phase) upon application of the positive and negative pulses between the two phase coils (V-W phase) in FIGS. 2A and 2B where $\theta_d$ an the horizontal axis indicates an electrical angle of the rotor, the number (1) shows the case of application of the positive pulse, and the number (2) shows the case of application of the negative pulse.

FIG. 2A shows the mode 3, in which current is applied from the V-phase to the W-phase. Conversely, FIG. 2B shows the mode 6, in which current is applied from the W-phase to the V-phase. When the angle of the rotor position is changed by one period of electrical angle in these modes, induced voltage appearing at the no-current-applied phase is shown in FIG. 3. As described above, it can be seen that the induced voltage of the U-phase changes according to the rotor position.

Note that, this induced voltage is not a speed electromotive voltage, but is a difference of rate of change of magnetic flux linking the V-phase and W-phase armature windings, which can be observed in the U-phase. Therefore, an induced voltage according to the rotor position can be observed even in the stop/low speed range. The voltage pulses shown in FIGS. 2A and 2B are applied in normal operation of 120 degree current application.

Figure 4:
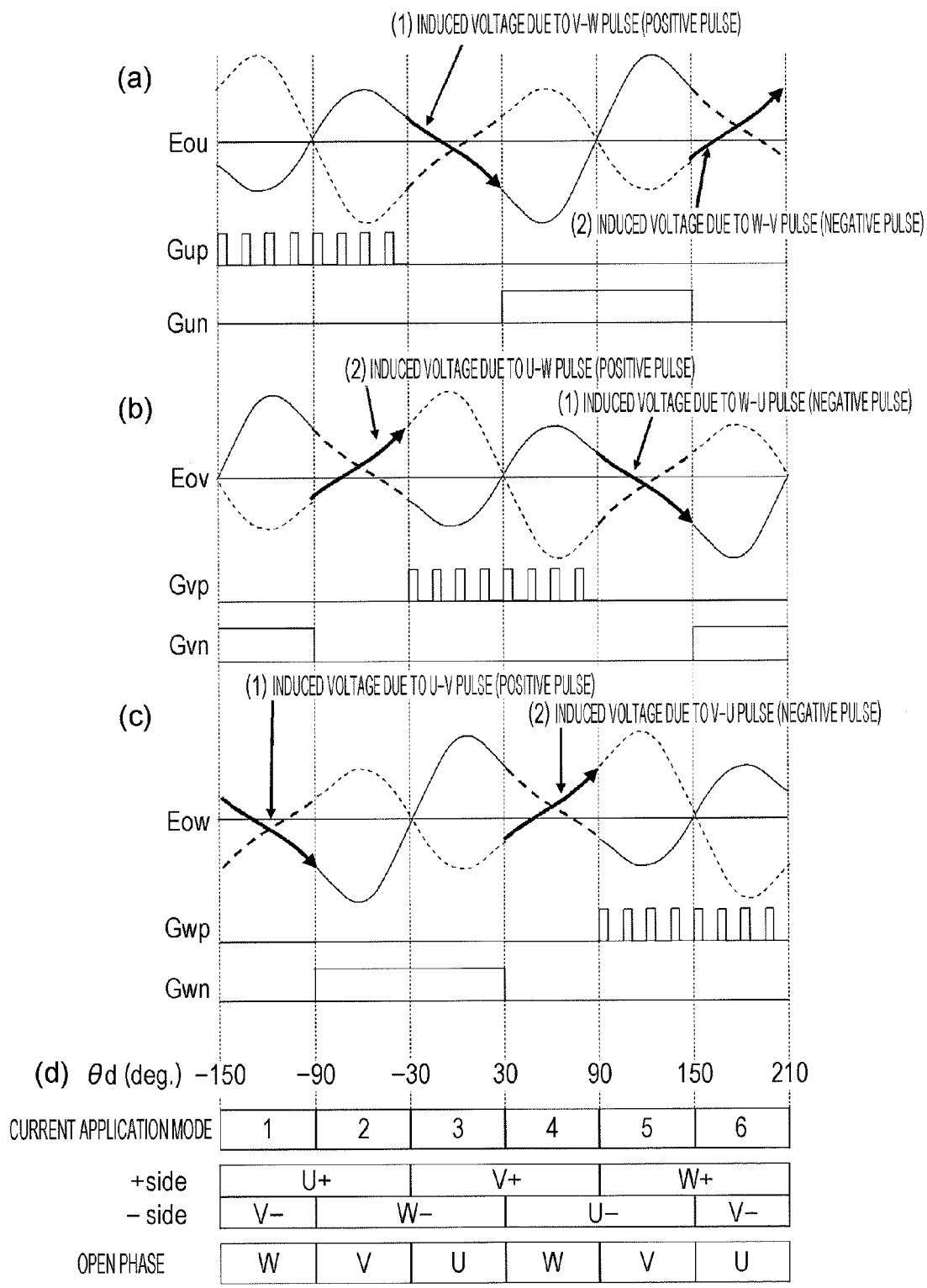
FIG. 4 shows an example of induced voltage generated at the no-current-applied phase coil upon application of positive and negative pulses between two phase coils (PWM control) when 120 degree current application control is performed on the first embodiment according to the present invention shown in FIG. 1, where a part (a) shows induced voltage at the U-phase upon application of a positive or negative pulse between V-W phase coils, a part (b) shows induced voltage at the V-phase upon application of a positive or negative pulse between W-U phase coils, and a part (c) shows induced voltage at the W-phase upon application of a positive or negative pulse between V-U phase coils, where a part (d) shows current-applied states of respective phase coils in six respective regions (current application modes) to which the current application operation shown in parts (a) to (c) are sectioned by an electrical angle, and where U+, V+, W+ on the + side respectively show that the switching elements Sup, Svp, Swp are in a conduction state, and V−, W−, U− on the − side respectively show that the switching elements Svn, Swn, Sun are in a conduction state.

FIG. 4 shows induced voltages Eou, Eov, Eow of the U-phase, V-phase, and W-phase, gate signals Gup, Gun, Gvp, Gvn, Gwp, and Gwn of the inverter 3, the rotor phase angle θd of the PM electrical motor 4, and current application states of the U-phase, V-phase, and W-phase in the current application modes 1 to 6. According to the rotor phase angle θd, two phases to be applied with current are switched every 60 degrees.

The mode 3 and the mode 6 in FIG. 4 are respectively equivalent to the states shown in FIGS. 2A, and 2B. The induced voltage of the U-phase at this time can be bold arrows on Eou that is shown with FIG. 3. Specifically, in the mode 3, the induced voltage decreasing to the minus direction can be observed, and in the mode 6, the induced voltage increasing to the plus direction can be observed.

According to the control device and the control scheme described above, an appropriate electrical motor drive torque according to the rotating rotor position can be obtained. The induced voltage of the no-current-applied phase is not caused by a speed electromotive voltage, but is an induced voltage as a transformer. Therefore, the induced voltage can be detected sensitively even in a very low speed state.

Such are the configuration of the control device and the control scheme that are common with the conventional technique.

A feature of the present invention: "initial position estimation scheme capable of preventing start-up failure and realizing start in a short time" will be described hereinafter.
(Control of PM Electrical Motor Upon Start in the Present Invention)

The feature of the present invention is to estimate a magnetic pole position of the synchronous electrical motor based on a sum and a difference of the induced voltage values of the respective open phases generated upon application of the positive pulse or the negative pulse when the synchronous electrical motor is started up in the 120 degree current application scheme, and then start up the synchronous electrical motor.

Figure 5:
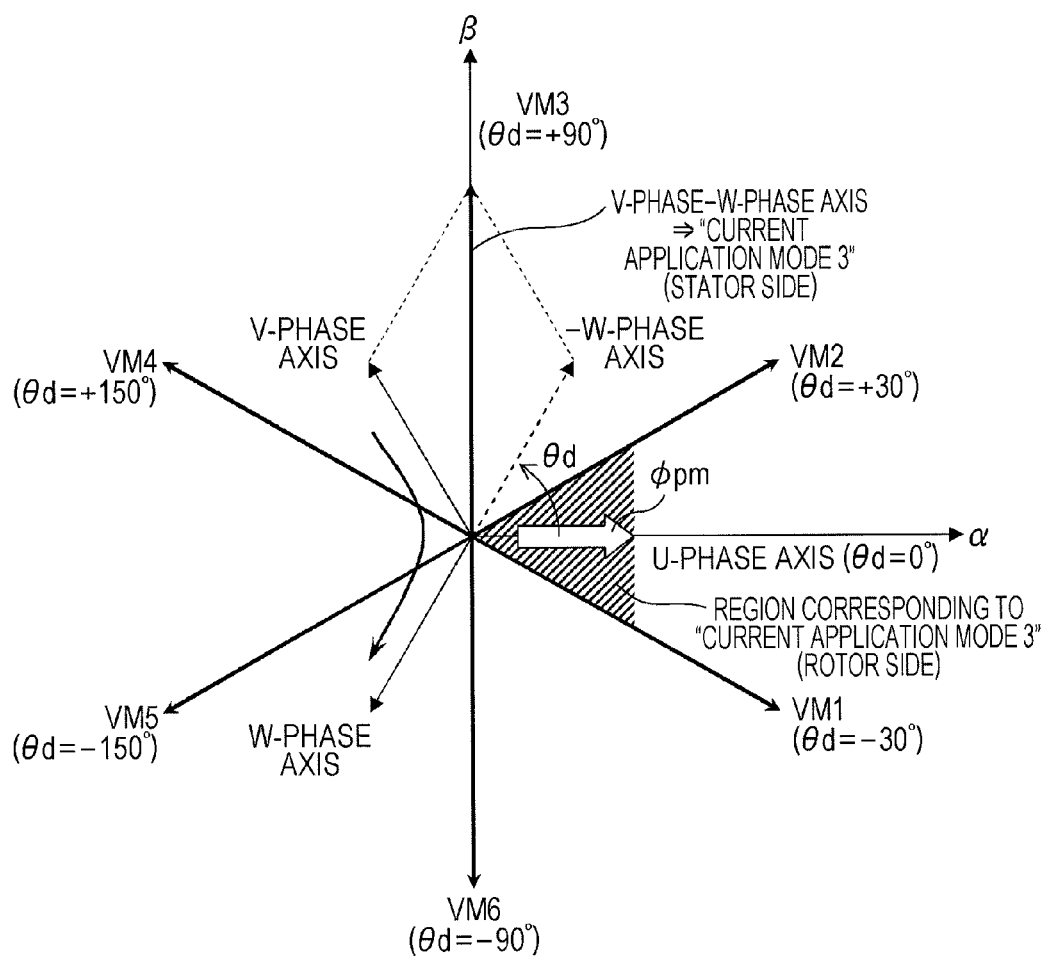
FIG. 5 is a schematic view of voltage vector notation of the current application mode 3 shown in FIG. 4.

FIG. 5 shows a voltage vector notation in a current application mode. In FIG. 5, voltage applied in the respective current application modes is through the three-phase to two-phase conversion (αβ conversion), and then is shown on the vector space. Each of the current application modes 1 to 6 are shown as voltage vectors VM1 to VM6 while setting the U-phase axis as α axis and setting a direction orthogonal thereto as β axis.

Note that in FIG. 5, a case of the current application mode 3 in which a positive pulse is applied between lines of the V-phase and the W-phase is described as an example.

In the current application mode 3, as shown in FIG. 5, the positive pulse that has been applied to the V-phase is applied to the W-phase as a negative pulse. Therefore, a magnetomotive force vector on the stator side at this time has a direction of a vector obtained by synthesizing a vector on the V-phase axis and a vector on the −W-phase axis (direction of VM3 in FIG. 5). On the other hand, the rotor position corresponding to the current application mode 3 is in the range of VM1 (θd=−30°) to VM2 (θd=30°). Specifically, a vector obtained by synthesizing the vector VM3 on the stator side and the vector of the magnet flux φpm on the rotor side is in the range of 90°±±30°, and thus a positive rotation torque is generated. Specifically, when φpm is in a shaded area shown in FIG. 5, a positive rotation torque is generated if the current application mode 3 is selected.

An appropriate current application mode is thus selected according to the rotor position so that the rotor does not rotate in the negative direction, and the PM electrical motor can be started up by the maximum torque. However, if the initial current application mode is faultily set, a start-up failure or a negative rotation may be caused. Therefore, the initial position estimation is an important technique.

Figure 6A:
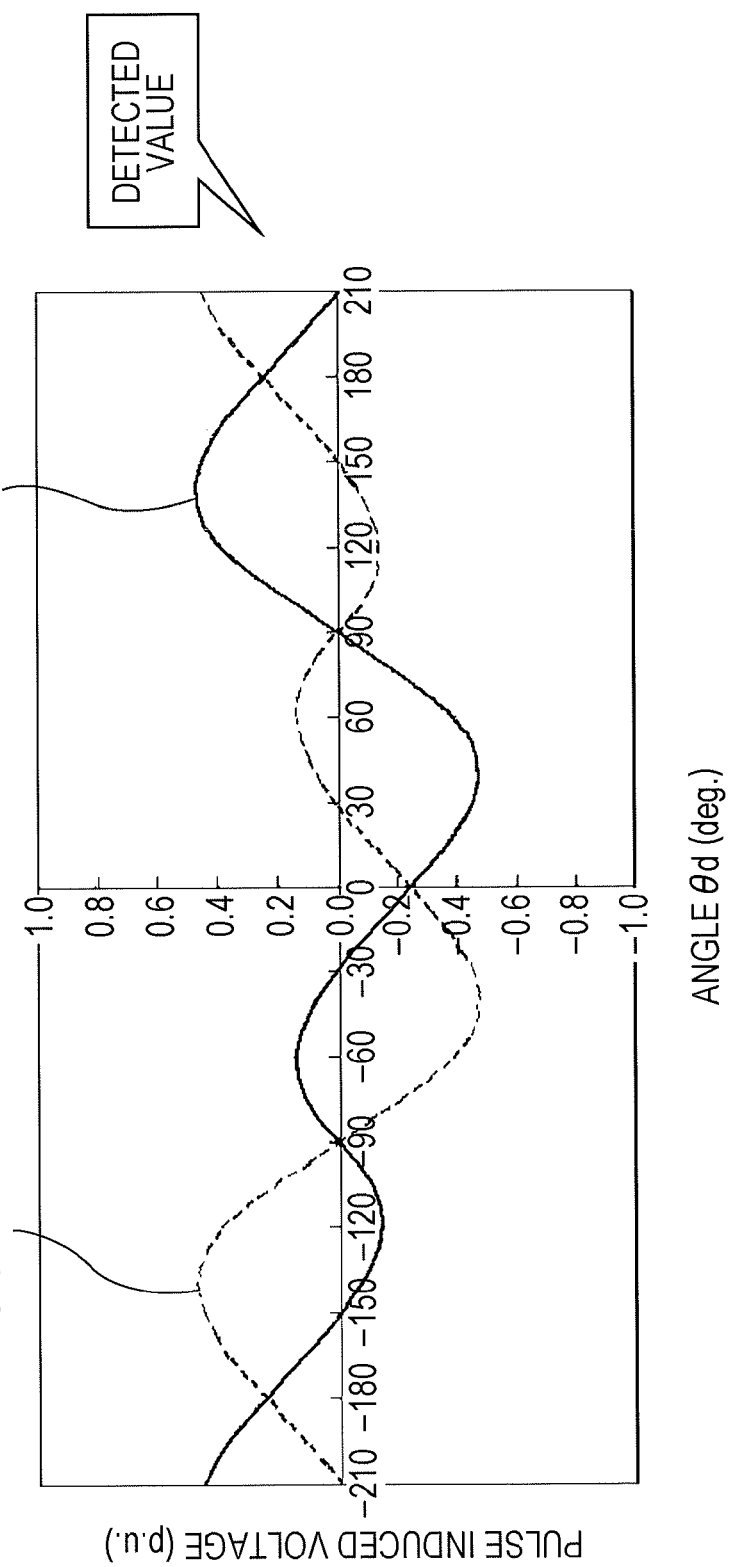

FIG. 6A shows detected values of the induced voltage of the U-phase generated when positive and negative pulses are respectively applied. Conditions for the U-phase to be open are the mode 3 and the mode 6, which respectively correspond to the positive pulse and the negative pulse. The induced voltage of the U-phase changes according to the electrical angle of the rotor position, and shows a characteristic mainly including a component of one period of the electrical angle and a frequency component that is two times the electrical angle. Waveforms obtained by shifting the waveform of the U-phase by ±120 degrees respectively appear at the V-phase and the W-phase, which are not shown in a drawing.

In an initial position estimation, current is applied in all of the six current application modes sequentially and the induced voltage in each of the respective modes is measured, whereby a total of six induced voltages can be obtained. From these six induced voltages that have been detected, an initial position of the rotor is inversely estimated. At this time, the switch 50 (refer to FIG. 1) is switched to input the induced voltage of the three-phase windings to an induced voltage detection unit 21 so as to perform the following processes.

FIG. 6B shows sums of the detected values of the induced voltage of the respective modes, and FIG. 6C shows differences of the detected values of the induced voltage of the respective modes. It is assumed that the rotor is fixed at a certain initial position. In this state, current is applied in the six modes so that the respective induced voltages are obtained. Then, processes for the sums (Usum, Vsum, Wsum) and the differences (Udif, Vdif, Wdif) of the induced voltage values are performed as shown in FIGS. 6B and 6C. The sum operations of the induced voltages are performed at an induced voltage synthesizing unit (sum) 23, and the difference operations of the induced voltages are performed at an induced voltage synthesizing unit (difference) 22, the induced voltage synthesizing units being shown in FIG. 1.

FIG. 6B shows the sums of the induced voltage values generated at the respective phases. It can be seen from the drawing that the sums change by one period corresponding to the one period of the electrical angle. Which means that a back calculation of the rotor position from the characteristic of FIG. 6B is possible in principle. JP-2009-189176-A may be a conventional example based on this principle.

However, such a characteristic shown in FIG. 6B cannot be always obtained to have a high sensitivity. The magnetic circuit characteristic of the electrical motor itself relates as a factor of decreasing the sensitivity. In other words, a sufficient estimation precision (resolution) may not be obtained depending on the PM electrical motor.
(Method of Estimating Current Application Mode in Present Invention)

In order to solve this problem, a characteristic of "differences" of the induced voltage values of the respective phases as shown in FIG. 6C are also used in performing the initial position estimation in the present invention. As shown in the drawings, the differences of the induced voltage values have a higher detection sensitivity than the sums of the induced voltage values so that the influence of noise can be suppressed. However, a component of one period of electrical angle is canceled and only a component of ½ period is enlarged. Therefore, the estimation range of the rotor position is ±90°. Therefore, a position estimation is performed based on the "difference" information as a first step, and then a determination of polarity (selection of N-pole or S-pole) is performed based on the "sum" information as a second step.

Figure 7:
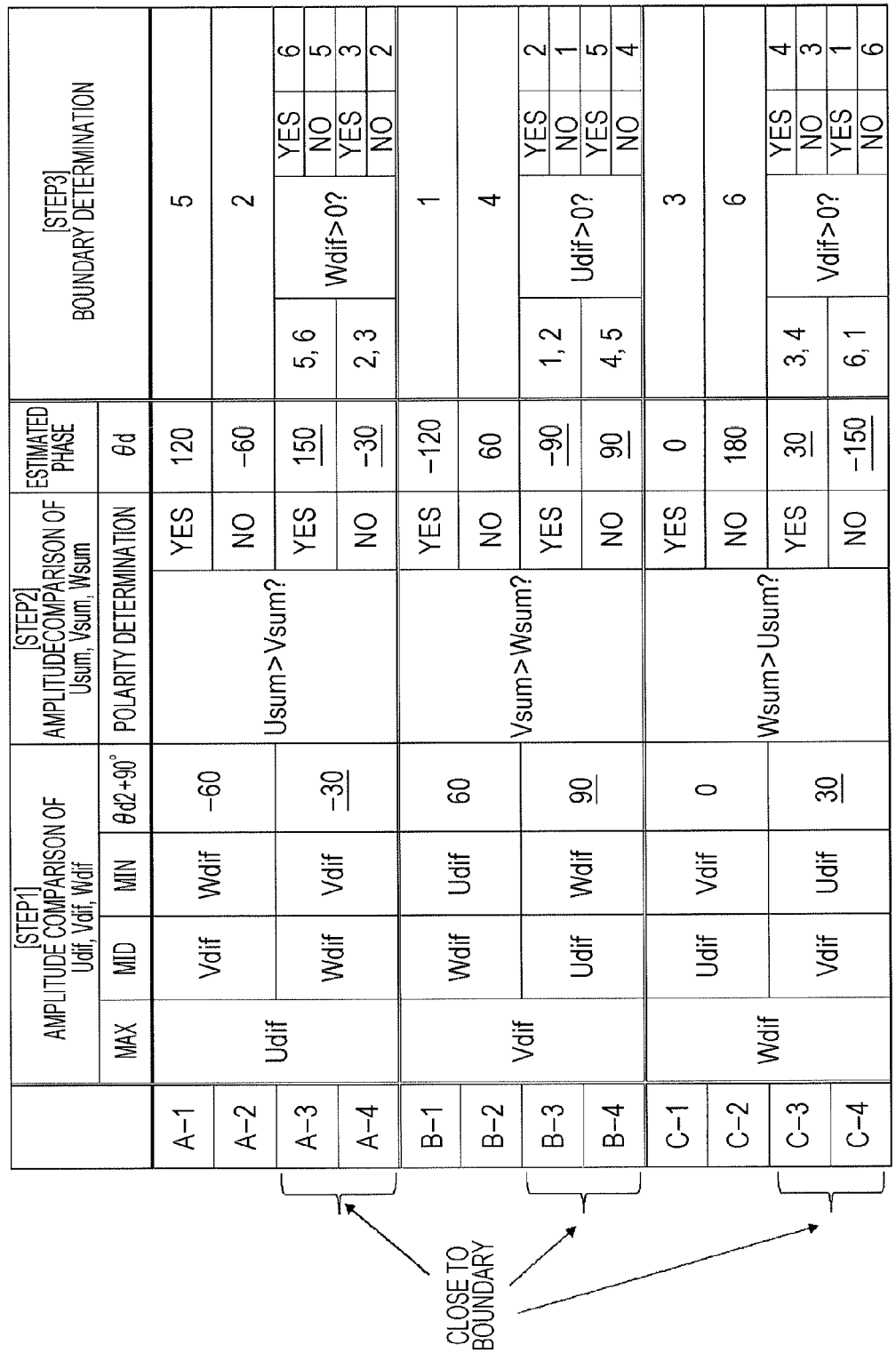
FIG. 7 is a determination table used for estimation of a rotor position in the first embodiment according to the present invention.

Next, referring to FIGS. 7 and 8A to 8C, specific process methods in the respective steps will be described. FIG. 7 is a table used to obtain an initial position based on the difference values (Udif, Vdif, Wdif) and the sum values (Usum, Vsum, Wsum) of the six induced voltage values of the respective phases that are detected in the respective current application mode and from their amplitude comparisons, and then to determine a mode in which current should be applied.

FIG. 8A shows a schematic view of induced voltage waveforms when the amplitude comparison is performed based on the differences of the induced voltage values detected in the respective modes (corresponding to STEP 1 in FIG. 8A), FIG. 8B shows a schematic view of induced voltage waveforms when the amplitude comparison is performed based on the sums of the induced voltage values detected in the respective modes (corresponding to STEP 2 in FIG. 8B), and FIG. 8C shows a schematic view of induced voltage waveforms to be a base when a boundary determination is performed (corresponding to STEP 3 in FIG. 8C).

As shown in FIG. 7, in [STEP 1], the range of the rotor phase is narrowed into the range of ±90° from the amplitude relationship (maximum (MAX), middle (MID), minimum (MIN)) of the "differences". In addition, in [STEP 2], the determination of polarity is performed based on the values of the "sums". As can be seen from the comparison of FIGS. 8B and 8C, when determination of polarity is performed using the values of the "sums" that is FIG. 8B, the waveform amplitude of the "sums" is small. Therefore, if the result of the position estimation is close to the boundary of the current application modes, the determination may not be performed precisely.

When the result of the position estimation is around the boundary, it can be easily determined to which current application mode the resultant position is closer by using the values of the "differences" as shown in FIG. 8C ([STEP 3]).

For example, if Udif is MAX, Wdif is MIN, Vdif is MID in STEP 1 of FIG. 8A, a region A-2(−60°) and a region A-1) (120°) can be candidates of the magnetic pole position of the rotor. Next, the amplitudes of Usum and Vsum are compared as STEP 2 shown in FIG. 8B so as to perform a determination of polarity. At this time, if the value of Usum is larger than the value of Vsum, the magnetic pole position of rotor is estimated to be 120°, and the current application mode 5 is selected by the boundary determination shown in FIG. 8C. On the other hand, if the value of Usum is smaller than the value of Vsum, the magnetic pole position of the rotor is estimated to be −60°, and the current application mode 2 is selected by the boundary determination shown in FIG. 8C.

Note that if Udif is MAX, Vdif is MIN, and Wdif is MID in STEP 1 in FIG. 8A, the regions A-3 and A-4 can be candidates in STEP 2 shown in FIG. 8B. If the magnetic pole position is assumed to be in a region A-4, the current application mode may be on the boundary of the current application modes 2 and 3. Therefore, the determination of polarity may be difficult and thus the torque may be insufficient depending on conditions. Therefore, when Wdif is more than zero, the current application mode 3 is selected, and when Wdif is smaller than zero, the current application mode 2 is selected by the boundary determination shown in FIG. 8C, and the motor is started up.

When the boundary determination determining if the current application mode in the region A-4 is mode 2 or mode 3 described as STEP 3 above is performed using the "sums", the value of Wsum in region A-4 is used (refer to FIG. 8B). When a similar determination is performed using Wsum in a region A-3, the change in the waveform of Wsum is inverse of the above description. Therefore, when the determination condition is "Wsum>0" in the rightmost column (STEP 3) of the table shown in FIG. 7, the order of the classifications (modes 5, 6) becomes inverse of that in the case using the "differ- ences". A table similar to FIG. 7 for the case when the "sums" are used and a description referring to the table are not provided.

However, as can be seen from FIG. 8B, when values of the "sums" are used, a determination of whether the region is A-3 or A-4 is possible but the boundary determination in these regions may not be performed precisely if the amplitudes of the values are small. In such a case, a determination or verification based on the values of "differences" is performed.

As described above, a determination of polarity based on the values of "sums" or "differences" is possible with the present invention. In addition, when the determination of polarity is performed based on the both values of "sums" and "difference", a more reliable verification of determination of polarity is possible. Note that the estimation of a current application mode described above is performed by a current application mode estimation unit (upon start up) 24 shown in FIG. 1.

Each of the STEPs of the determination of polarity described above is performed in post processing using the obtained six induced voltage values, and a processing time of the each STEP is a few to tens of micro seconds. However, in order to obtain the six induced voltage values, a little more than ten milliseconds are needed also considering the transient. Yet, the start up is possible within very short time.

Thus, by applying the drive system of the present invention to various synchronous electrical motors, a rotor initial position when the motor is stopped can be estimated precisely, whereby a start-up failure or a negative rotation can be prevented and the electrical motor can be started up within short time.

Second Embodiment

Figure 9A:
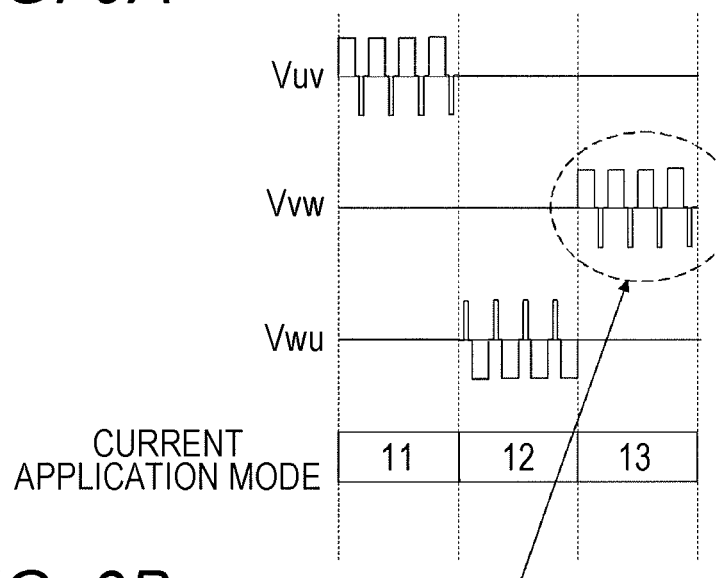
FIGS. 9A and 9B are views showing an example of pulse voltage waveforms to be applied between respective phase coils of a rotor in a second embodiment of a drive system of a synchronous electrical motor according to the present invention, where
Figure 9B:
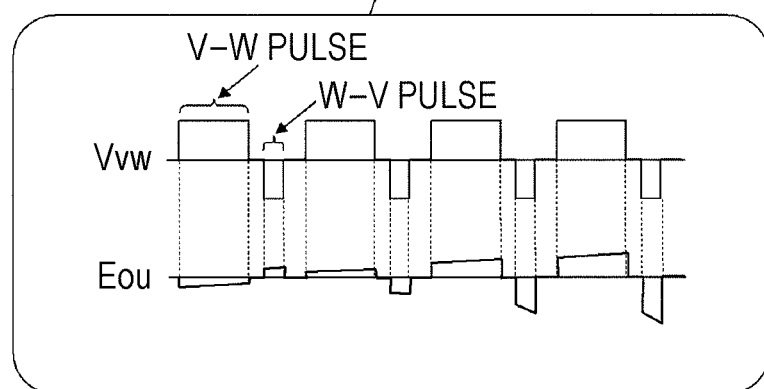

Referring to FIGS. 9A and 9B, a second embodiment of a drive system of a synchronous electrical motor according to the present invention will be described.

In the first embodiment, the induced voltage values of the open phase in the six modes 1 to 6 are required for the initial position estimation, and thus voltage pulses has to be sequentially applied to the PM electrical motor in the respective modes in order to measure these induced voltage values. However, long time is required to obtain the six induced voltage values also considering the transient, and thus it is not efficient. With the initial position estimation method of this embodiment, an initial position of the rotor can be estimated within shorter time.

FIGS. 9A and 9B show waveforms of modes 11 to 13 in which a positive pulse voltage and a negative pulse voltage are output alternately. By using the pulse forming method upon PWM control, these waveforms can be applied. In this case, an induced voltage due to a positive pulse and an induced voltage due to a negative pulse can be obtained almost at the same time, whereby the above-described six induced voltage values can be obtained in substantially three current application modes. Therefore, time needed to detect induced voltage can be decreased by half.

Note that although in FIGS. 9A and 9B, the widths of the positive pulse (V-W pulse) and the negative pulse (W-V pulse) have unequal widths as shown in FIG. 9B, for example, positive and negative pulses having equal widths should be applied alternately so that the average value is zero upon an initial position estimation. If a pulse is biased toward the positive side or the negative side, a torque may be generated and the rotor position may change depending on the conditions. By considering ringing, it is only necessary to secure a width of at least 2 to 20 micro seconds. Therefore, by applying positive and negative pulses alternately almost at the same time, more accurate induced voltage value can be obtained.

Thus, with the second embodiment of the drive system of the synchronous electrical motor according to the present invention, a drive system of a synchronous electrical motor capable of precisely estimating a rotor initial position when the motor is stopped within short time can be provided.

Third Embodiment

Referring to FIGS. 10A to 10E and FIGS. 11A and 11B, a third embodiment of a drive system of a synchronous electrical motor according to the present invention will be described.

Figure 10A:
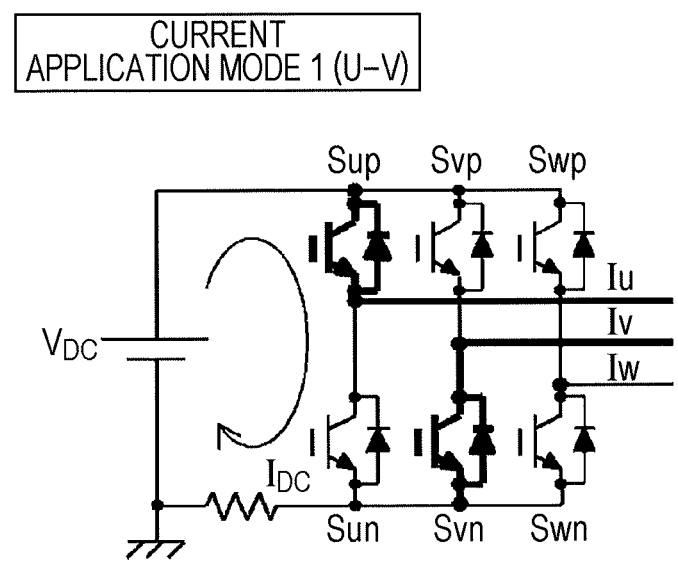

FIGS. 10A to 10E are diagrams schematically showing a line voltage waveform between two phases between which current is applied, and a phase current waveform and current flowing through a protective resistance (shunt resistance) 35 of an inverter at the time. FIG. 10A shows inverter current upon Vuv (state where Sup on the P side and Svn on the N side are ON), FIG. 10B shows a line voltage waveform of Vuv, FIG. 10C shows a phase current waveform of Iu, FIG. 10D shows DC current of $I_{DC}$, and FIG. 10E shows a change of link magnetic flux of the d-axis with respect to current of the d-axis. Note that $I_{DC}$ is calculated from a voltage generated at the shunt resistance 35, the voltage having been input to the current application mode estimation unit (upon start up) 24 (refer to FIG. 1).

In the first embodiment, when the detection sensitivity of the induced voltage of the PM electrical motor is very small, the induced voltage is buried in noise, and thus the current application mode upon determination of polarity is difficult. Therefore, there is a slight possibility of start-up failure.

Figure 11A:
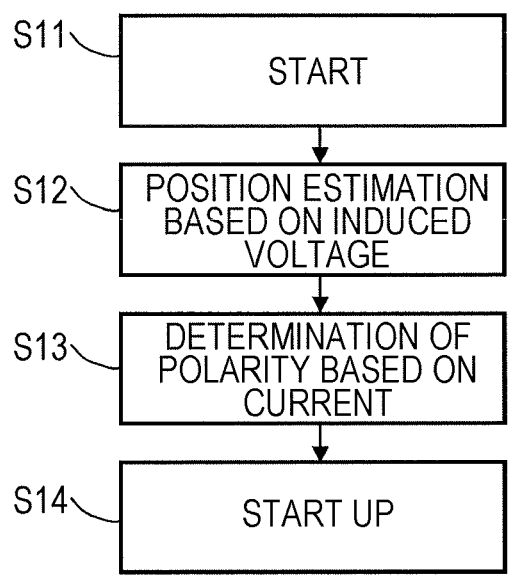
FIGS. 11A and 11B are views for explaining an operation of the third embodiment of the drive system of the synchronous electrical motor according to the present invention, where
Figure 11B:
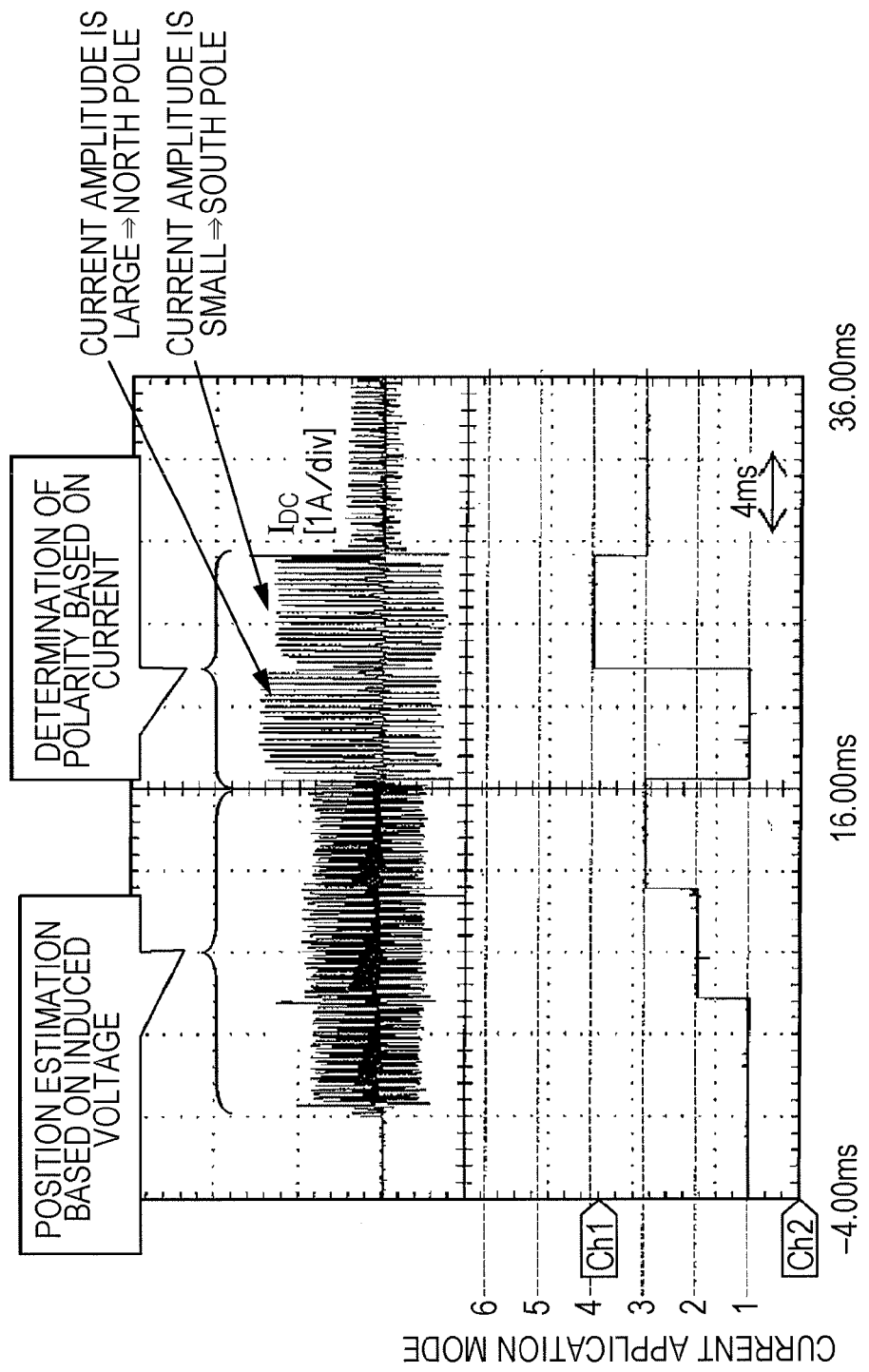

Then, in this embodiment, a position estimation is performed based on the sums and the differences of the induced voltage values described in the first embodiment, and thereafter a determination of polarity (selection of N-pole or S-pole) is further performed based on current in the estimated current application mode as shown in FIGS. 11A and 11B so that a possibility of start-up failure can be further decreased.

As shown in FIGS. 10A to 10E, the reason amplitudes of the phase current Iu and the DC current $I_{DC}$ change even though the line voltage Vuv is constant is magnetic saturation. When negative current is applied to the magnetic pole position of the rotor that is the d-axis, the magnetic flux of the permanent magnet is decreased (demagnetization), which does not cause magnetic saturation or decreases the influence of magnetic saturation. On the contrary, when positive current is applied, the magnetic flux of the permanent magnet is increased (magnetization), which causes magnetic saturation or increases the influence of magnetic saturation. In other words, this is a principle that when the influence of magnetic saturation is increased, the inductance is decreased, and thus flowing current is increased even when the amplitude of the line voltage is constant.

Based on this principle, as shown in a flowchart of FIG. 11A, a position estimation is performed based on at least one of the sums and the differences of the induced voltage values in the first embodiment (step S12), and thereafter a determination of polarity based on current is performed in the estimated current application mode (step S13) so that a possibility of start-up failure can be further decreased.

FIG. 11B shows an example of an actual initial position estimation based on the current application mode estimation described using FIGS. 6A to 6C or FIGS. 8A to 8C and the principle shown in FIGS. 10A to 10E, and shows a relationship between the DC current $I_{DC}$ and the current application modes. The almost left half of FIG. 11B corresponds to the current application mode estimation described using FIGS. 6A to 6C or FIGS. 8A to 8C, and the right half is the determination of polarity based on FIGS. 10A to 10E. For purpose of description, in a waveform shown in the upper part of FIG. 11B, the left half shows a voltage waveform, and the right half shows a current waveform.

In FIG. 11B, in the case of position estimation based on the induced voltage in step S12, positive and negative pulses are alternately applied as described in the second embodiment (second embodiment) so as to obtain the six induced voltage values corresponding to the current application modes 1 to 6 in the current application modes 11 to 13. Next, the magnetic pole position of the rotor is estimated based on at least one of the sums and the differences of the obtained induced voltage values, and then current is applied to the three-phase coils in the current application mode that is determined based on the estimated magnetic pole position. As shown in FIG. 11B, it is determined that the magnetic pole position is in the current application mode 1, and thus current is applied in the current application mode 1 and the current application mode 4 that has a reverse polarity thereof. When the determination of polarity based on current is next performed in step S13, the amplitudes of the DC current $I_{DC}$ in the current application mode 1 and the current application mode 4, which are described previously, are compared. As a result, it is determined that a current value when current is applied in the current application mode 1 is larger. Therefore, it is determined that the magnetic pole position of the rotor is in the current application mode 1, and thus is close to the range of θd=−30° to +30°. Therefore, it is only necessary to generate the maximum torque by applying current to the three-phase coils in the current application mode 3 in order to start up the PM electrical motor. From the test result, it can be seen that the PM motor is started in the current application mode 3.

Thus, with the third embodiment of the present invention, a drive system of a synchronous electrical motor capable of precisely estimating a rotor initial position when the motor is stopped in shorter time can be provided.

Note that the third embodiment has been described referring to FIGS. 10A to 10E and FIGS. 11A and 11B, and in FIGS. 11A and 11B, a voltage pulse application method in the second embodiment as shown in FIGS. 9A and 9B is assumed. This third embodiment may be applied in addition to the voltage pulse application method in the first embodiment shown in FIG. 4. Which means that even in the first embodiment, the rotor magnetic pole position can be precisely estimated when the determination of polarity based on the amplitude comparison of Usum and Vsum in STEP 2 shown in FIG. 8B is not precise enough because the detection sensitivity of the induced voltage of the PM electrical motor is very small.

Alternatively, the rotor magnetic pole position can be estimated based on the differences of the induced voltages described in the first embodiment and the result of the DC current measurement in the third embodiment without using the sums of the induced voltages.

Modification of Third Embodiment

Next, a modification of the third embodiment of a drive system of a synchronous electrical motor according to the present invention is described referring to FIG. 12.

In the third embodiment, the position estimation based on the induced voltage is performed, and thereafter determination of polarity (selection of N-pole or S-pole) is further performed based on the DC current $I_{DC}$ in the estimated current application mode similarly to the first embodiment.

In this modification, the induced voltage of the respective open phases that is generated upon application of positive and negative pulses (first and second embodiments) is detected and at the same time, the DC current $I_{DC}$ is detected as illustrated in FIG. 12.

The process is started in step S21. In step S22, current is applied to the three-phase coils in the modes 11 to 13 in which the positive and negative pulses are alternately applied as described in the second embodiment similarly to FIG. 11B, for example. Six induced voltages of the open phases in the respective current application modes and six DC current values are detected and stored. In step S23, a magnetic pole position is estimated based on at least one of sums and differences of the stored six induced voltages, and based on the estimated magnetic pole position, it is determined in which of the current application modes 1 to 6, current is applied to the three-phase coils. Then, the DC current values detected and stored in the determined current application mode and the DC current value detected and stored in a current application mode that has a characteristic opposite to the determined mode are compared in their amplitude so as to perform the determination of polarity. By the above-described procedure, a rotating electric machine can be correctly started up within short time.

Thus, in an example of FIGS. 11A and 11B, for example, current detection shown as step S13 in FIG. 11B is already performed in the operation of rotation position estimation based on the induced voltage in step S12 at the same time of voltage detection. Therefore, measuring time can be shortened, and the rotation position estimation can be performed in short time.

After the detection of the induced voltage and the DC current, a magnetic pole position of the synchronous electrical motor is estimated based on the induced voltage values of the respective open phases, the determination of polarity is also performed based on the detected value of the current, and then the synchronous electrical motor is started up to rotate positively.

The feature of the drive system of the synchronous electrical motor of the present invention is that a positive pulse and a negative pulse are applied between two phases out of three-phase windings, a candidate of the rotor magnetic pole position (electrical angle) is estimated based on the differences of the induced voltages of the respective open phases upon application of the positive pulse or the negative pulse, and determination of polarity of the rotor position is also performed using at least the sums of the induced voltages, whereby the rotor position can be precisely detected, as can be seen from the above-described first to third embodiments and the modification. This drive system of the synchronous electrical motor allows accurate determination of a current application mode out of the six current application modes in which the synchronous electrical motor is to be started. Each of the six current application modes has the electrical angle range of 60° for rotation drive by 120 degree current application.

The determination of polarity of the rotor position may be performed based on the sums of the induced voltages of the open phases upon application of the positive pulse and the negative pulse between two phases out of the three-phase windings that are used in the above-described conventional technique (first embodiment), and may be performed using the differences of the induced voltages to determine more precisely (first embodiment). Alternatively, the determination may be performed based on the amplitude of DC current that flows when a positive pulse or a negative pulse is applied (third embodiment and modification).

The number of conditions for applying an electrical pulse between two phases out of the three-phase windings is six as a combination of selection of the two phases and selection of positive or negative (modes 1 to 6 in the above description). With the drive system of the synchronous electrical motor according to the present invention, the number of modes for applying current to the three-phase windings can be reduced to half (modes 1 to 3, for example) by alternately applying a positive pulse and a negative pulse between two phases out of the above-described three-phase windings. Thus, measurement of the induced voltage of the open phase and the current measurement of the DC power source in the third embodiment and the modification can be further shortened.

As described above, with the third embodiment and the modification of the drive system of the synchronous electrical motor according to the present invention, drive system of a synchronous electrical motor capable of precisely estimating a rotor initial position when the motor is stopped in shorter time can be provided.

Next, referring to FIG. 13, a fourth embodiment of a drive system of a synchronous electrical motor according to the present invention will be described.

Fourth Embodiment

Figure 13:
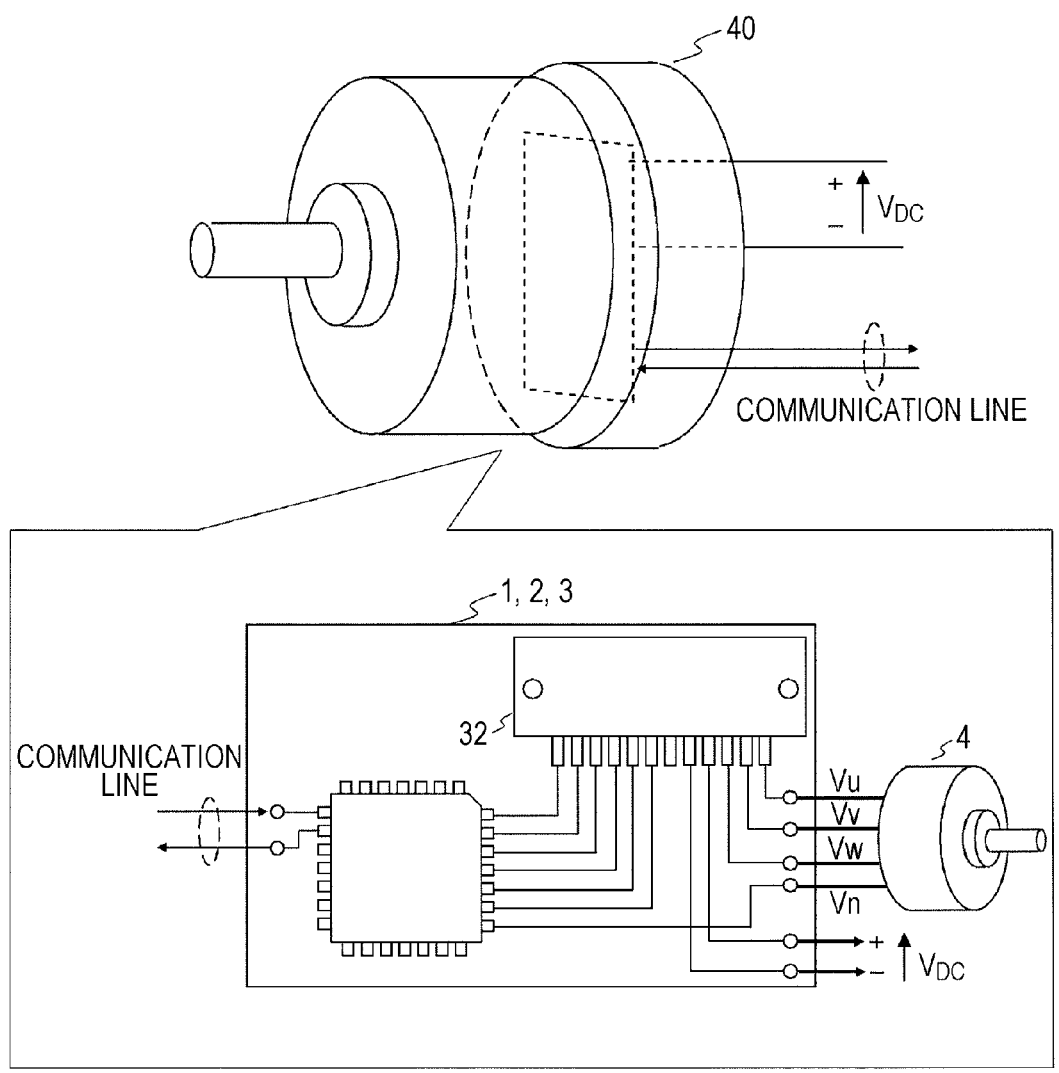
FIG. 13 is a view showing a configuration of a fourth embodiment of a drive system of a synchronous electrical motor according to the present invention.

FIG. 13 is a schematic view of a configuration of the fourth embodiment of the drive system of the synchronous electrical motor according to the present invention. In this embodiment, one of the drive systems of synchronous electrical motors of the above-described embodiments is mounted inside a chassis of the PM electrical motor so as to form a so-called mechatronics structure. Inside a chassis 40 in FIG. 13, all parts described hereinbefore are housed, and only communication lines for exchanging instructions to the PM electrical motor and operations states with the DC power source 31 are led out to the outside.

By thus integrating the drive system of the PM electrical motor, the size can be reduced and wire routing can be unnecessary. In addition, since the PM electrical motor drive system according to the present invention is configured without requiring a position sensor or a speed sensor of the rotor, the whole system can be more compact.

With the mechatronics structure of the fourth embodiment as described above, a drive system of a synchronous electrical motor which is capable of precisely estimating a rotor initial position when the motor is stopped in shorter time and the whole of which is compact can be provided.

Fifth Embodiment

Figure 14:
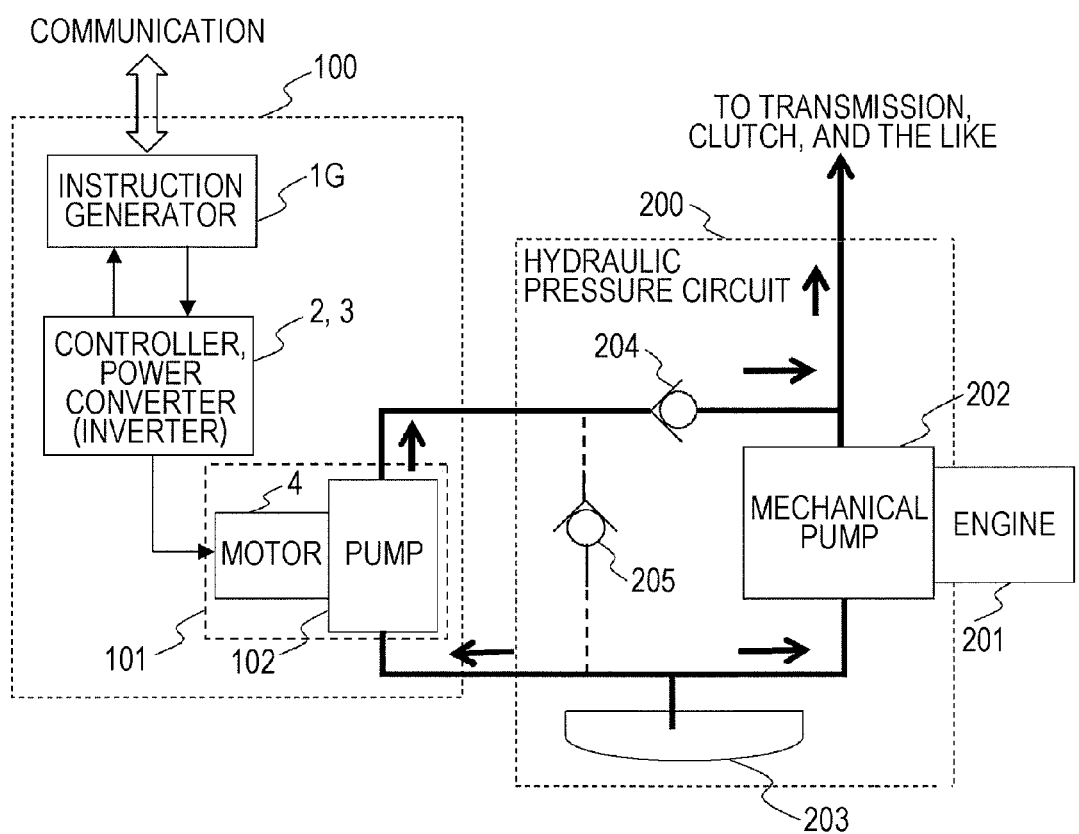
FIG. 14 is a view showing a configuration example of an electric hydraulic pump system including the drive systems of the synchronous electrical motors of one of the first to fourth embodiments that is a fifth embodiment of a drive system of a synchronous electrical motor according to the present invention.
Figure 15:
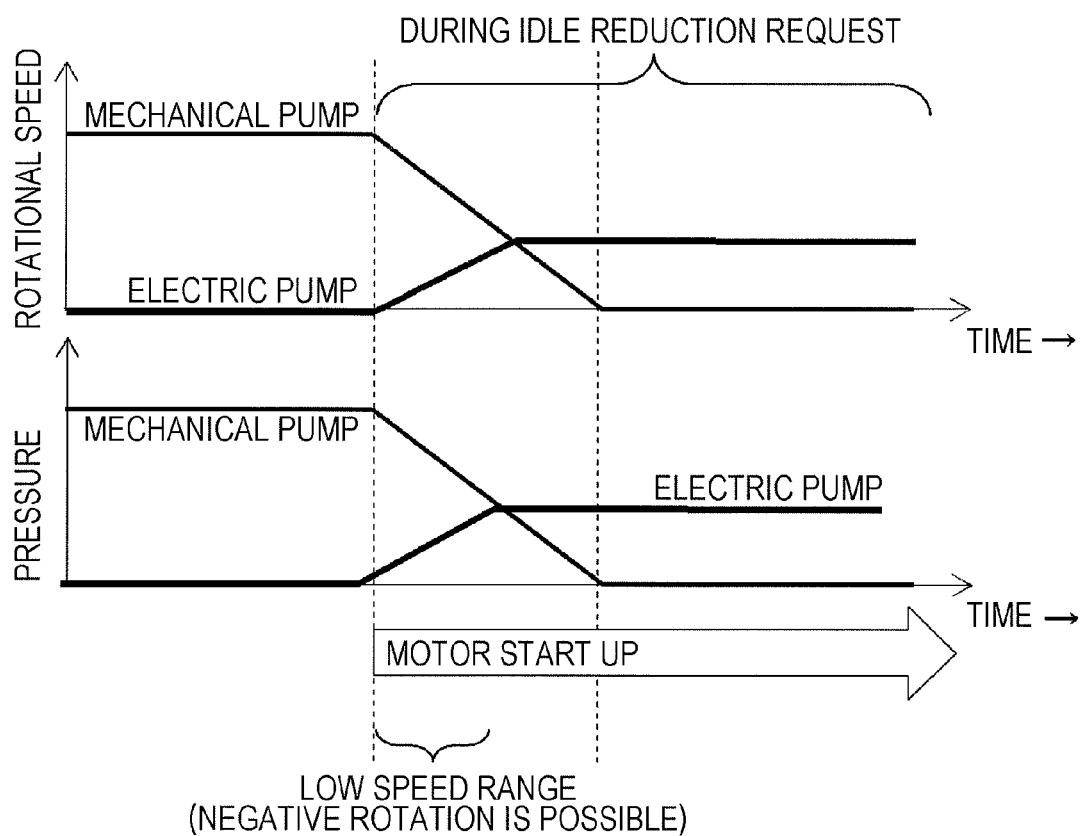
FIG. 15 is a schematic view showing a time course of an operation of the electric hydraulic pump system shown in FIG. 14.

Referring to FIGS. 14 and 15, an electric hydraulic pump system provided with the above described drive system of the synchronous electrical motor as a fifth embodiment according to the present invention will be described.

FIG. 14 is a block diagram of the electric hydraulic pump system driven during idle reduction of a vehicle. This electric hydraulic pump system is used not only during idle reduction, but also used to ensure a hydraulic pressure to a transmission, a clutch, a brake, and the like in a vehicle having an engine that may completely stops such as a hybrid vehicle. The reference sign 100 indicates one of the PM electrical motor drive systems according to the above-described embodiments, and an electric pump 102 is constituted of the electrical motor 4 and a pump 101. Upon engine stop, the electric pump 102 controls the hydraulic pressure of a hydraulic pressure circuit 200. The hydraulic pressure circuit 200 includes: a mechanical pump 202 driven by power of an engine 201; a tank 203 for storing oil; and a check valve 204 that prevents backflow from the mechanical pump 202 to the electric pump 102.

In the conventional electric hydraulic pump system, a relief valve 205 for keeping the hydraulic pressure no higher than a set value is provided, but the relief valve can be eliminated in the system of the present invention. The reason will be described referring to FIG. 15 with the description of the operation of the electric hydraulic pressure system to be provided below.

While the Engine 201 rotates and the mechanical pump 202 generates sufficient hydraulic pressure, the electric pump 102 is stopped and hydraulic pressure is generated by the mechanical pump 202. The rotation speed decreases and the discharge pressure of the mechanical pump 202 starts to decrease at the time of stopping the drive of the engine 201 upon request of idle reduction and the like. On the other hand, an electric pump 101 is started up and starts to generate hydraulic pressure. At the time when the discharge pressure amounts of the mechanical pump 202 and the electric pump 102 are inverted, the check valve 204 opens and the electric pump 102 ensures the hydraulic pressure.

At this time, upon stop of the engine 201, it is desirable to start up the electric pump 102 before the mechanical pump 202 stops and thus the engine 201 stops so that the hydraulic pressure generated by the electric pump 102 has a sufficient value at a timing when the hydraulic pressure generated by the mechanical pump 202 is lower than or equal to the hydraulic pressure generated by the electric pump 102. Specifically, the electric pump 102 is desirably started up at the time of the stop instruction of the engine 201 or around the time.

Also upon restart of the engine 201, the rotational speed of the mechanical pump 202 increases with the rotation of the engine 201, and the hydraulic pressure thereof also increases with the rotational speed of the engine 201. Therefore, the electric pump 102 is preferably kept driven until the hydraulic pressure of the mechanical pump 202 exceeds the hydraulic pressure supplied by the electric pump 102 while the engine 201 is stopped. For example, the electric pump 102 is preferably kept driven until the engine 201 reaches a rotation speed that makes the hydraulic pressure of the mechanical pump 202 a predetermined value, or a time for driving the electric pump 102 from restart of the engine 201 or the like is preferably set.

The brief description of the operation of the electric hydraulic pressure system is provided hereinbefore. The operation of the relief valve 205 is now described. As a condition for the check valve 204 to open, the pressure of discharged oil from the electric pump 102 has to exceed the pressure of discharged oil from the mechanical pump 202. The pressure changes depending on load conditions or temperature conditions of the hydraulic pressure circuit 200, and the pressure may cause an excessive load on the electric pump 102 side. At this time, it is necessary to open the relief valve 205 and relieve the hydraulic pressure so as to decrease the load on the electric pump 102.

If the relief valve 205 is not provided, negative rotation and step-out of the electrical motor 4 are caused in a low speed range, and the hydraulic pressure cannot be ensured by the electric pump 102. If there is no or insufficient discharge pressure of this electric pump 102, pressure on the transmission or the clutch is not efficient at the end of idle reduction until the hydraulic pressure by the mechanical pump 202 increases, which slows start of a vehicle or cause shock at start.

The reason of stop by step-out of an electrical motor is that the rotor position cannot be accurately estimated in a low speed range by the conventional technique as described above, which causes torque insufficiency upon negative rotation or start up of the electrical motor 4. Of course, this problem can be solved by mounting a rotor position sensor. But providing a rotor position sensor may cause a problem of sensor reliability or a problem of wiring and mounting adjustment work.

With the drive system of the synchronous electrical motor according to the present invention, the electrical motor can be stably driven from stopped state to high rotation range, and the rotor position can be estimated. Therefore, no problem is caused. According to the present invention, the relief valve 205 can be eliminated as shown in FIG. 14. As a result, there is no wasteful work of the electric pump 102, and a highly efficient and quiet electric hydraulic pressure system can be provided.

The description hereinbefore is for the embodiments and the modification of the invention and the present invention is not limited to these embodiments or modification. A person skilled in the art can make various modifications without impairing the features of the present invention.

What is claimed is:

1. A drive system of a synchronous electrical motor comprising:
    a synchronous electrical motor;
    a power converter that is connected to the synchronous electrical motor and that is constituted of a plurality of switching elements;
    a controller that controls the synchronous electrical motor by outputting a voltage instruction to the power converter;
    a voltage detection unit that detects induced voltages at respective open phases upon application of respective positive and negative pulse voltages between respective two phases out of three-phase windings of the synchronous electrical motor;
    an induced voltage difference calculating unit that calculates an induced voltage difference that is a difference between an induced voltage detected by the voltage detection unit at each of the open phases upon application of the positive voltage pulse between the corresponding two phases and an induced voltage detected by the voltage detection unit at the open phase upon application of the negative voltage pulse between the two phases;
    an induced voltage sum calculating unit that calculates an induced voltage sum that is a sum of the induced voltage detected by the voltage detection unit at each of the open phases upon application of the positive voltage pulse between the corresponding two phases and the induced voltage detected by the voltage detection unit at the open phase upon application of the negative voltage pulse between the two phases; and
    a rotor position determining unit that determines a rotor position based on the induced voltage difference and the induced voltage sum.

2. The drive system of a synchronous electrical motor according to claim 1, wherein
    the rotor position determining unit determines a polarity of a rotor based on the induced voltage sum.

3. The drive system of a synchronous electrical motor according to claim 2, wherein
    the rotor position determining unit determines the polarity of the rotor based on the induced voltage sum and the induced voltage difference.

4. A drive system of a synchronous electrical motor comprising:
- a synchronous electrical motor;
- a power converter that is connected to the synchronous electrical motor and that is constituted of a plurality of switching elements;
- a controller that controls the synchronous electrical motor by outputting a voltage instruction to the power converter;
- a voltage detection unit that detects induced voltages at respective open phases upon application of respective positive and negative pulse voltages between respective two phases out of three-phase windings of the synchronous electrical motor;
- an induced voltage difference calculating unit that calculates an induced voltage difference that is a difference between an induced voltage detected by the voltage detection unit at each of the open phases upon application of the positive voltage pulse between the corresponding two phases and an induced voltage detected by the voltage detection unit at the open phase upon application of the negative voltage pulse between the two phases;
- a current detection unit that detects a current value of DC (Direct Current) power supplied to the power converter; and
- a rotor position determining unit that determines a rotor position based on the induced voltage difference and the current value of the DC (Direct Current) power.

5. The drive system of a synchronous electrical motor according to claim 4, wherein
the induced voltages at the respective open phases generated upon application of respective positive and negative voltage pulses are respectively detected, and also the current value of the DC (Direct Current) power supplied to the power converter is detected.

6. The drive system of a synchronous electrical motor according to claim 1, wherein
when the induced voltages at the open phases are detected by applying the respective positive and negative voltage pulses, a voltage pulse having positive voltage pulses and negative voltage pulses alternately is applied between the two phases out of the three-phase windings of the synchronous electrical motor to detect the induced voltages at the open phases.

7. The drive system of a synchronous electrical motor according to claim 1, wherein
a pulse width of the positive or negative pulse voltage is within a range of at least 2 μs to 20 μs.

8. The drive system of a synchronous electrical motor according to claim 1, wherein
the synchronous electrical motor, the power converter, and the controller are integrated, and the drive system is configured in such a manner that power lines for the power converter and the controller, and a signal line for the controller are led to outside.

9. A pump drive system using a synchronous electrical motor, the pump drive system including the drive system of a synchronous electrical motor according to claim 1, wherein
a water pump or a hydraulic pump is driven as a load of the synchronous electrical motor.

10. The drive system of a synchronous electrical motor according to claim 2, wherein
when the induced voltages at the open phases are detected by applying the respective positive and negative voltage pulses, a voltage pulse having positive voltage pulses and negative voltage pulses alternately is applied between the two phases out of the three-phase windings of the synchronous electrical motor to detect the induced voltages at the open phases.

11. The drive system of a synchronous electrical motor according to claim 3, wherein
when the induced voltages at the open phases are detected by applying the respective positive and negative voltage pulses, a voltage pulse having positive voltage pulses and negative voltage pulses alternately is applied between the two phases out of the three-phase windings of the synchronous electrical motor to detect the induced voltages at the open phases.

12. The drive system of a synchronous electrical motor according to claim 4, wherein
when the induced voltages at the open phases are detected by applying the respective positive and negative voltage pulses, a voltage pulse having positive voltage pulses and negative voltage pulses alternately is applied between the two phases out of the three-phase windings of the synchronous electrical motor to detect the induced voltages at the open phases.

13. The drive system of a synchronous electrical motor according to claim 5, wherein
when the induced voltages at the open phases are detected by applying the respective positive and negative voltage pulses, a voltage pulse having positive voltage pulses and negative voltage pulses alternately is applied between the two phases out of the three-phase windings of the synchronous electrical motor to detect the induced voltages at the open phases.

14. The drive system of a synchronous electrical motor according to claim 2, wherein
a pulse width of the positive or negative pulse voltage is within a range of at least 2 μs to 20 μs.

15. The drive system of a synchronous electrical motor according to claim 3, wherein
a pulse width of the positive or negative pulse voltage is within a range of at least 2 μs to 20 μs.

16. The drive system of a synchronous electrical motor according to claim 4, wherein
a pulse width of the positive or negative pulse voltage is within a range of at least 2 μs to 20 μs.

17. The drive system of a synchronous electrical motor according to claim 5, wherein
a pulse width of the positive or negative pulse voltage is within a range of at least 2 μs to 20 μs.

18. The drive system of a synchronous electrical motor according to claim 6, wherein
a pulse width of the positive or negative pulse voltage is within a range of at least 2 μs to 20 μs.

19. The drive system of a synchronous electrical motor according to claim 2, wherein
the synchronous electrical motor, the power converter, and the controller are integrated, and the drive system is configured in such a manner that power lines for the power converter and the controller, and a signal line for the controller are led to outside.

20. The drive system of a synchronous electrical motor according to claim 3, wherein
the synchronous electrical motor, the power converter, and the controller are integrated, and the drive system is configured in such a manner that power lines for the power converter and the controller, and a signal line for the controller are led to outside.

* * * * *